United States Patent
Nemoto et al.

(10) Patent No.: US 10,193,162 B2
(45) Date of Patent: Jan. 29, 2019

(54) ELECTRODE CATALYST AND METHOD FOR PRODUCING THE SAME

(71) Applicant: Kumiai Chemical Industry Co., Ltd., Tokyo (JP)

(72) Inventors: Nobukatsu Nemoto, Fukushima (JP); Izuru Kobayashi, Fukushima (JP); Kazuto Umezu, Tokyo (JP); Masaji Akimoto, Tokyo (JP)

(73) Assignee: Kumiai Chemical Industry Co., Ltd., Tokyo (JP)

( * ) Notice: Subject to any disclaimer, the term of this patent is extended or adjusted under 35 U.S.C. 154(b) by 290 days.

(21) Appl. No.: 15/129,482

(22) PCT Filed: Mar. 20, 2015

(86) PCT No.: PCT/JP2015/058604
§ 371 (c)(1),
(2) Date: Sep. 27, 2016

(87) PCT Pub. No.: WO2015/146858
PCT Pub. Date: Oct. 1, 2015

(65) Prior Publication Data
US 2017/0104220 A1 Apr. 13, 2017

(30) Foreign Application Priority Data
Mar. 27, 2014 (JP) ................. 2014-065922

(51) Int. Cl.
*B01J 31/06* (2006.01)
*H01M 4/90* (2006.01)
*C08G 79/00* (2006.01)
*B01J 31/02* (2006.01)
*H01M 8/1018* (2016.01)

(52) U.S. Cl.
CPC .......... *H01M 4/9008* (2013.01); *C08G 79/00* (2013.01); *B01J 31/0234* (2013.01);
(Continued)

(58) Field of Classification Search
CPC .... B01J 31/0234; B01J 31/0252; B01J 31/06; B01J 31/069; H01M 4/9008; H01M 2008/1095; C08G 79/00
(Continued)

(56) References Cited

U.S. PATENT DOCUMENTS 3,396,123 A * 8/1968 Urban ................ B01J 37/00
208/207
4,087,378 A * 5/1978 Carlson ............ B01J 31/0225
502/163
(Continued)

FOREIGN PATENT DOCUMENTS

JP 2255726 A 10/1990
JP 2010275115 A 12/2010
(Continued)

OTHER PUBLICATIONS

Morioka et al., "Electrochemical Properties of Metal-Supported Carbon Catalysts Obtained by Calcination of Metal Phthalocyanine Derivatives", Polymer Preprints, May 14, 2013, p. 1570, vol. 62, No. 1, English-language translation pp. 1-2.

*Primary Examiner* — Patricia L. Hailey
(74) *Attorney, Agent, or Firm* — The Webb Law Firm

(57) ABSTRACT

An electrode catalyst obtained by calcining a metal phthalocyanine polymer having a repeating structural unit obtained by the amide bonding of a structural unit represented by general formula (1a) to a structural unit represented by general formula (2a) to form a calcined body, then treating the calcined body with an acid. Formula (1a) (wherein L is a divalent or trivalent metal ion belonging to Period 3 to Period 5 on the long-form periodic table.) Formula (2a) (wherein M is a divalent or trivalent metal ion belonging to Period 3 to Period 5 on the long-form periodic table.)

20 Claims, 10 Drawing Sheets

(52) U.S. Cl.
CPC ............ *B01J 31/0252* (2013.01); *B01J 31/06* (2013.01); *B01J 31/069* (2013.01); *H01M 2008/1095* (2013.01)

(58) Field of Classification Search
USPC ................................................ 502/101, 163
See application file for complete search history.

(56) References Cited

U.S. PATENT DOCUMENTS

| | | | | |
|---|---|---|---|---|
| 5,151,515 | A * | 9/1992 | Cisar | .................... B01J 31/1616 |
| | | | | 429/523 |
| 9,774,042 | B2 * | 9/2017 | Nemoto | .............. H01M 4/8882 |
| 2007/0059928 | A1 * | 3/2007 | Harutyunyan | .......... C23C 18/06 |
| | | | | 438/679 |
| 2010/0285390 | A1 * | 11/2010 | Liu | ..................... H01M 4/9008 |
| | | | | 429/483 |
| 2011/0281719 | A1 * | 11/2011 | Liu | .......................... B01J 23/26 |
| | | | | 502/1 |
| 2013/0273461 | A1 * | 10/2013 | Liu | ..................... H01M 4/9008 |
| | | | | 429/535 |
| 2013/0309561 | A1 * | 11/2013 | Chen | ...................... B82Y 30/00 |
| | | | | 429/188 |

FOREIGN PATENT DOCUMENTS

| | | | |
|---|---|---|---|
| JP | 20116283 | A | 1/2011 |
| JP | 2012517075 | A | 7/2012 |
| WO | 2010064555 | A1 | 6/2010 |
| WO | 2014175077 | A1 | 10/2014 |

* cited by examiner

[FIG. 1]
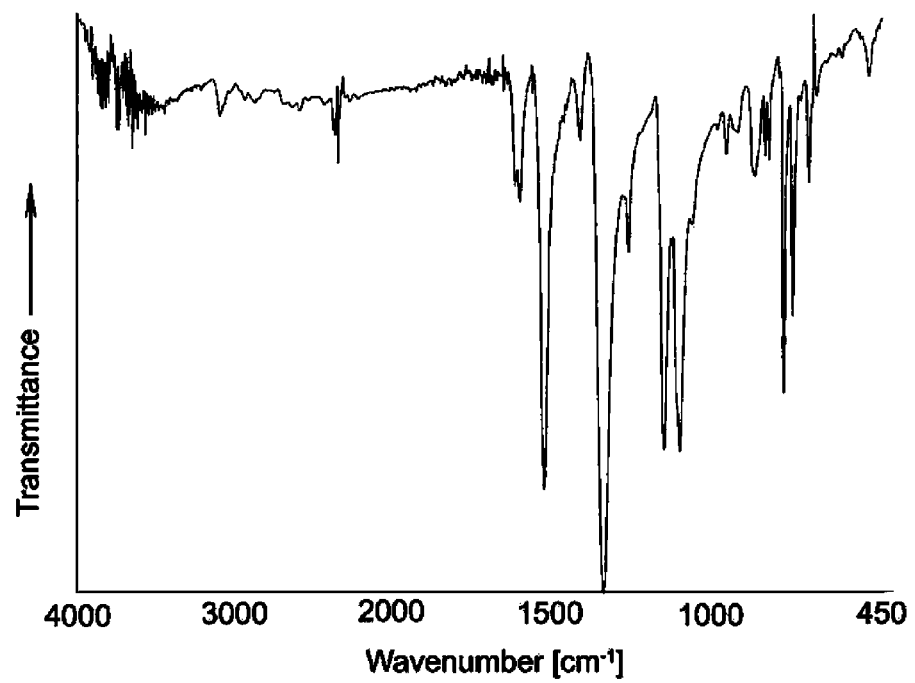

[FIG. 2]
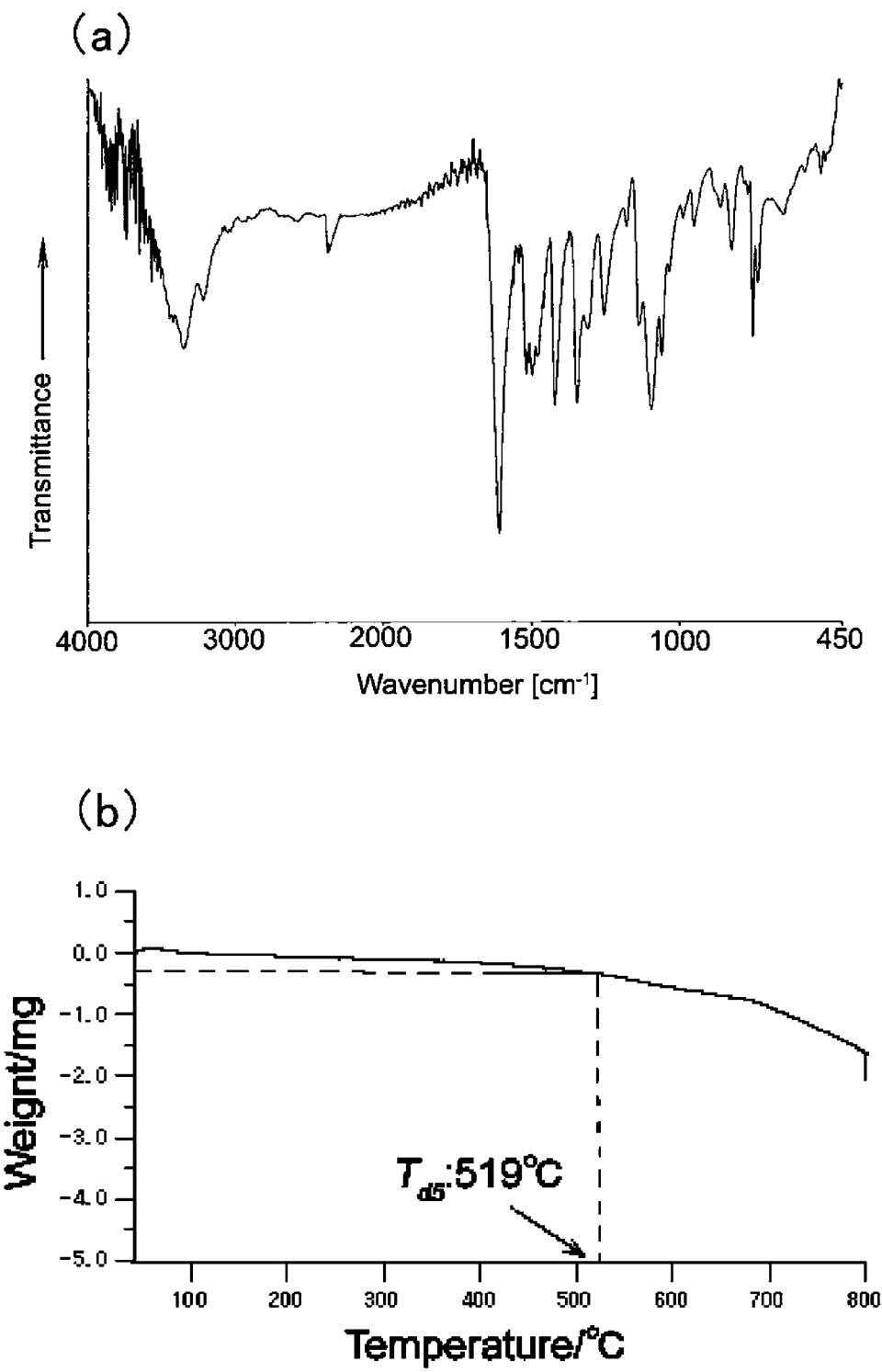

[FIG. 3]
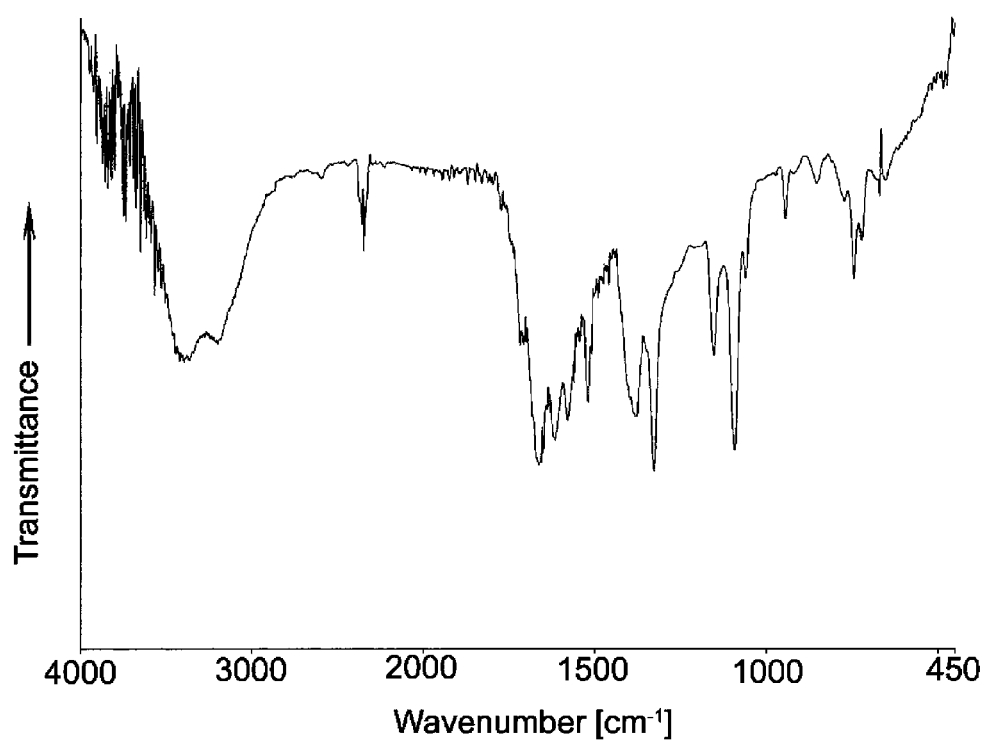

[FIG. 4]
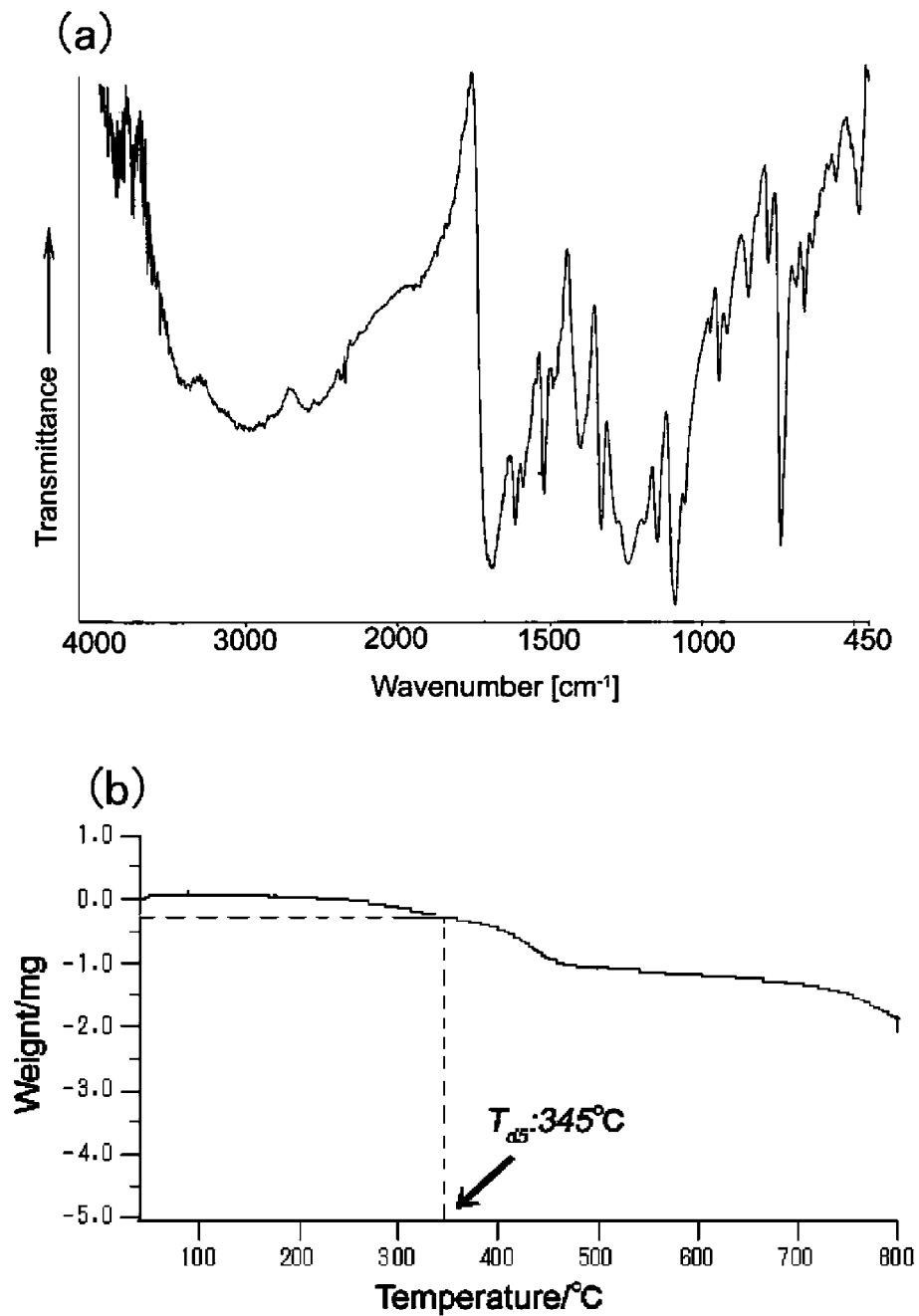

[FIG. 5]
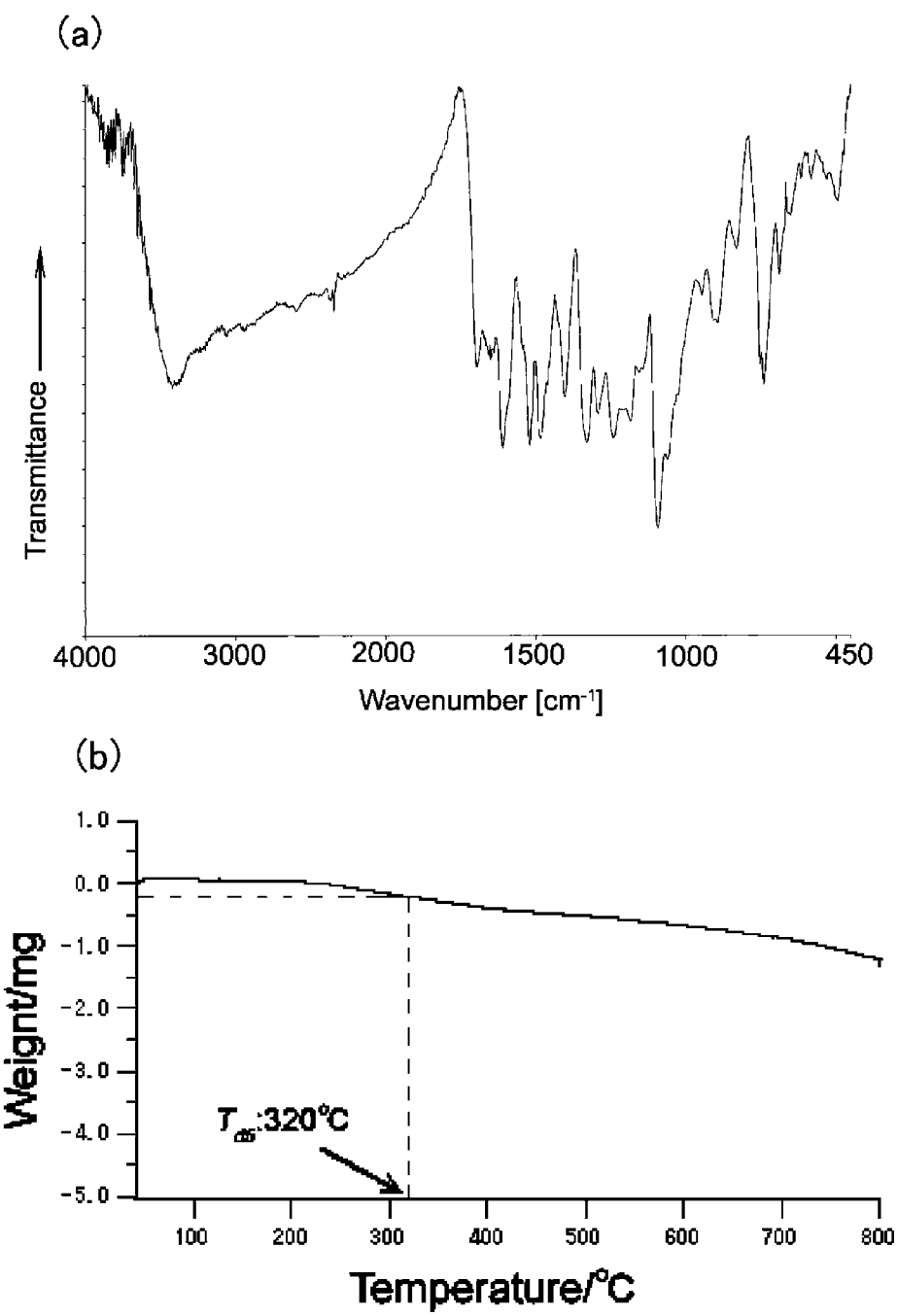

[FIG. 6]
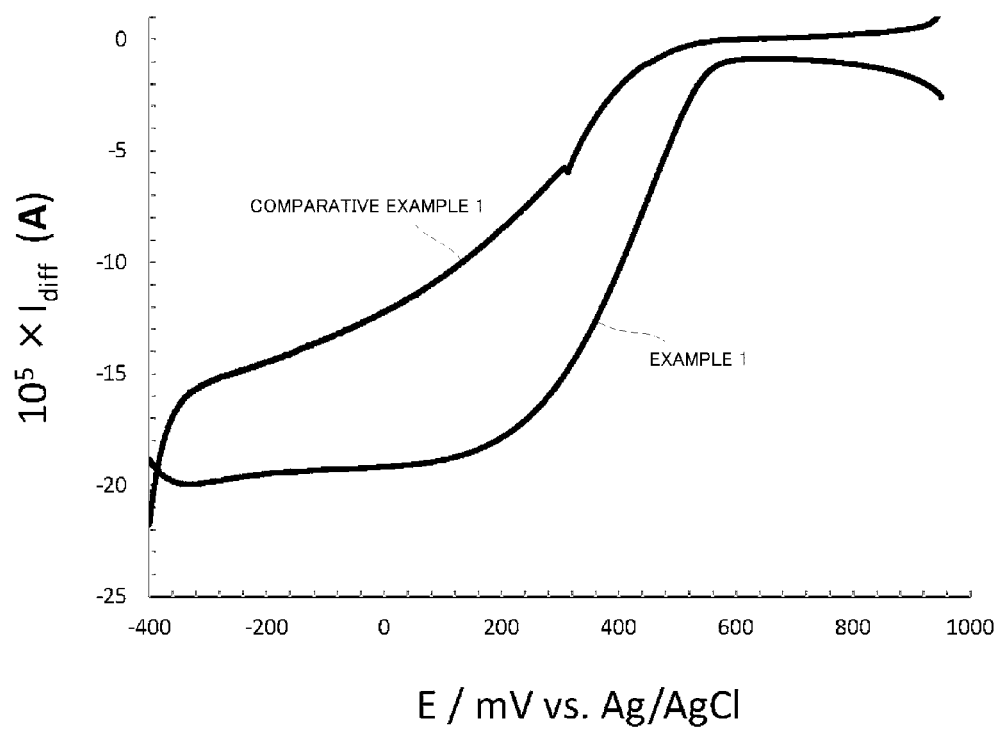

[FIG. 7]
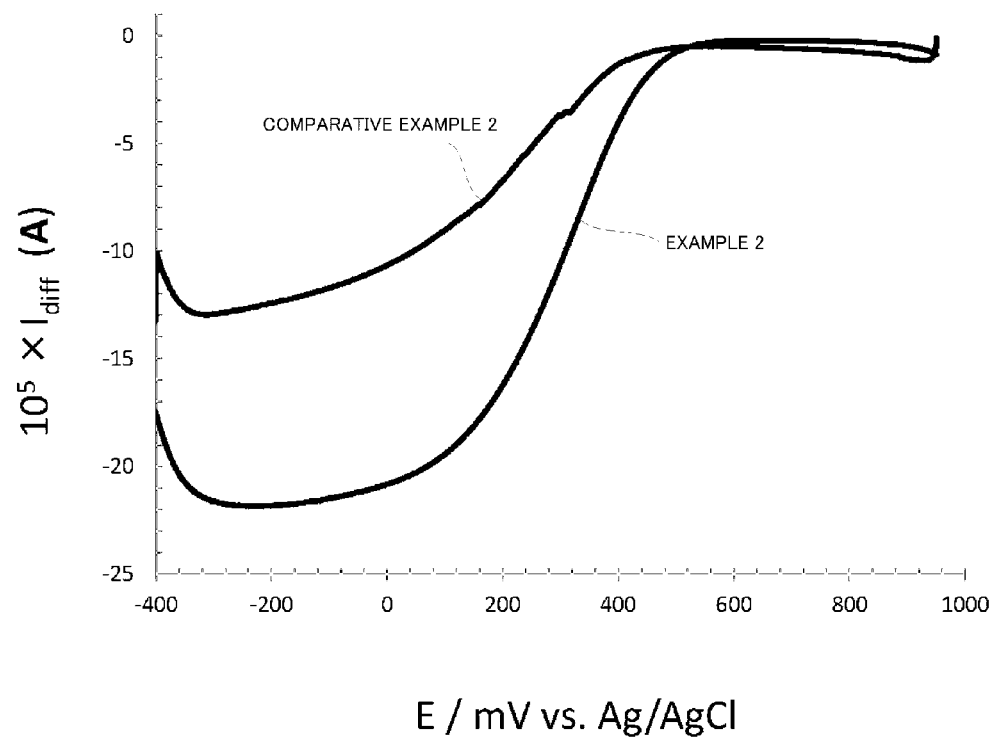

[FIG. 8]
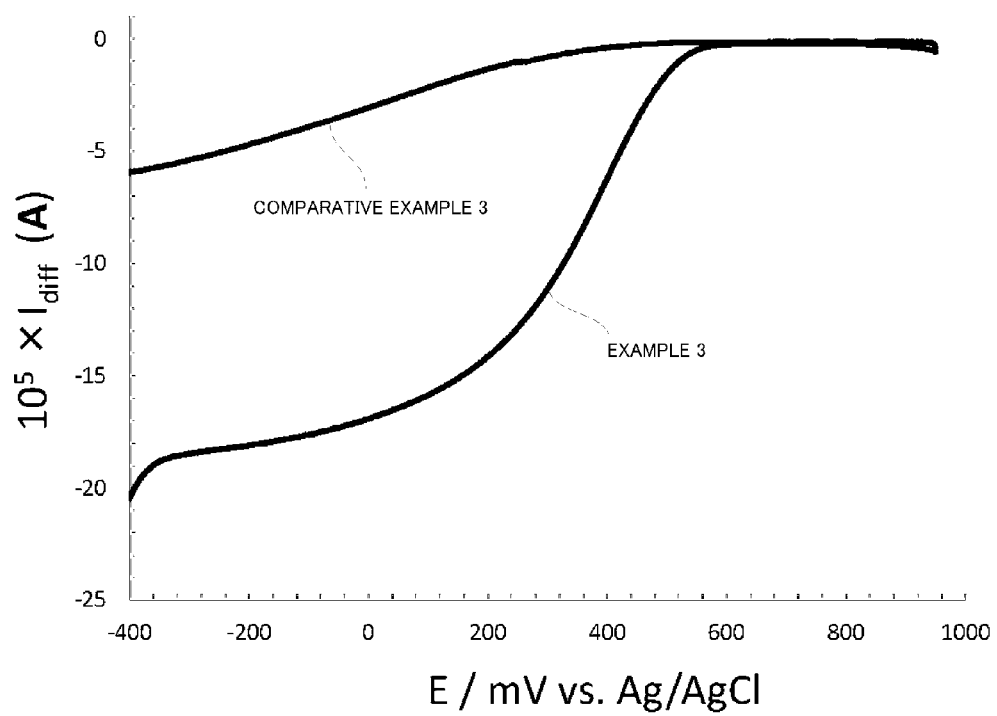

[FIG. 9]
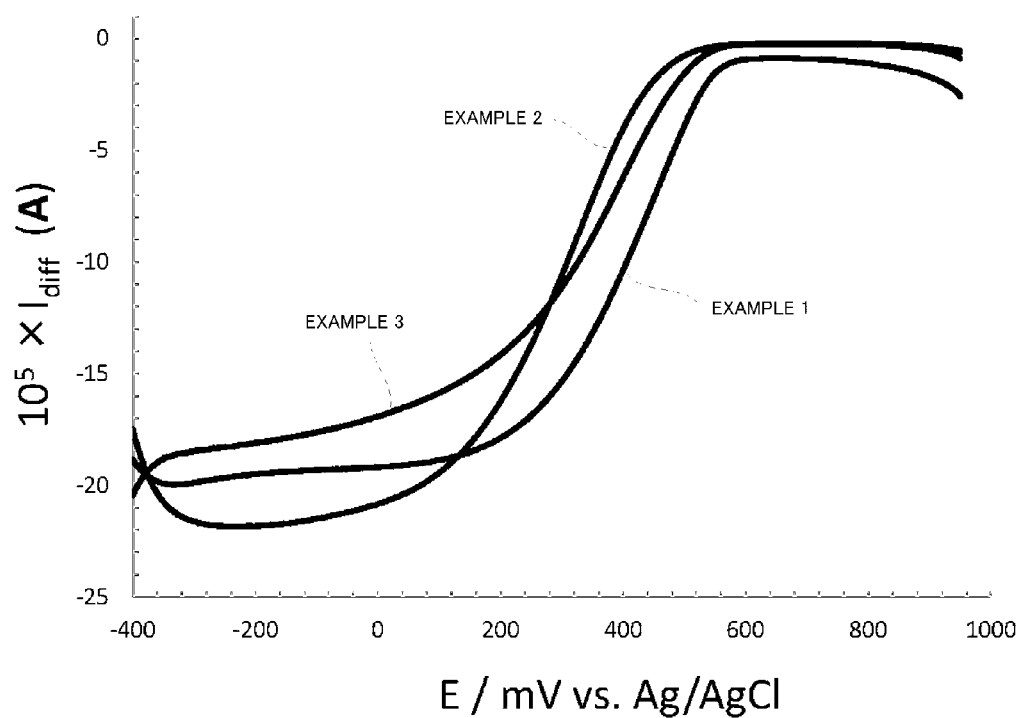

[FIG. 10]
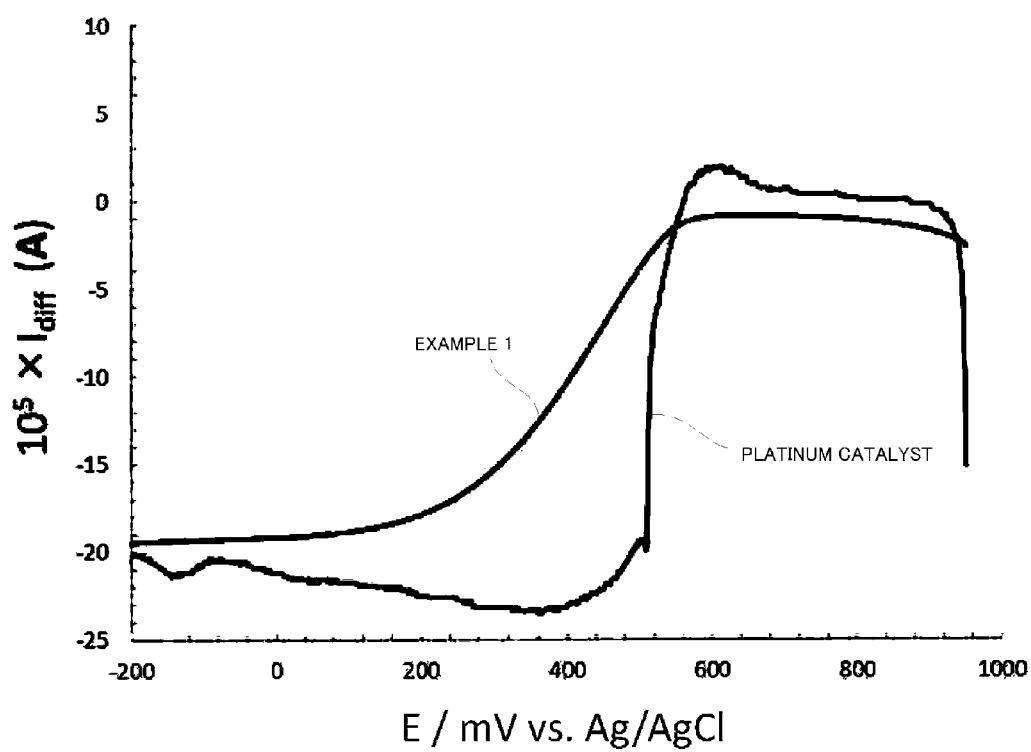

ELECTRODE CATALYST AND METHOD FOR PRODUCING THE SAME

CROSS-REFERENCE TO RELATED APPLICATIONS

This application is the United States national phase of International Application No. PCT/JP2015/058604 filed Mar. 20, 2015, and claims priority to Japanese Patent Application No. 2014-065922 filed Mar. 27, 2014, the disclosures of which are hereby incorporated in their entirety by reference.

TECHNICAL FIELD

The present invention relates to an electrode catalyst and a method for producing the same, and particularly relates to an electrode catalyst that can be preferably used in an electrode of a fuel cell and a method for producing the same.

BACKGROUND ART

Currently, fossil fuels are used as a main energy source. However, fossil fuels are finite. Furthermore, fossil fuels have a problem that carbon dioxide generated when it is used increases greenhouse effect. Therefore, development of energy source in place of fossil fuels is desired. One of new energy sources includes a fuel cell.

Compared to primary batteries and secondary batteries, a fuel cell is a power generator semipermanently usable by continuously supplying hydrogen and oxygen as fuel. A fuel cell has attracted also because the used fuel can be reused. Among them, polymer electrolyte fuel cell (PEFC) operates at low temperatures, and reduction in size and weight is possible since its electrolyte is thin-film like. Thus, PEFC is expected to be applied to home electric appliances, mobile devices, automobile battery, and the like. PEFC has a structure in which an electrolyte film is sandwiched between two electrodes, cathode (positive electrode) and anode (negative electrode). In PEFC, fuels, such as oxygen to a positive electrode and hydrogen to a negative electrode, are supplied, and an electric energy can be obtained from a chemical reaction caused in the electrode.

The cathode of the fuel cell carries an electrode catalyst, and catalyzes a reaction to reduce oxygen to water. The reaction rate of oxygen reduction reaction on the cathode side is relatively low, thus a catalyst for efficiently operating the reaction is necessary. As the electrode material, carbon-based electrode materials and the like are known, and a platinum-containing catalyst is currently most effective as a carbon-based electrode catalyst for efficiently operating a fuel cell. However, since platinum is a noble metal, a problem on costs is pointed out. Therefore, creation of a novel catalyst not using platinum has been expected.

Incidentally, the important thing in the creation of the carbon-based electrode catalyst is to create a carbon material having high conductivity, wide surface area, and good dispersibility, and metal is finely dispersed in the material. As one of the base material of such carbon material, phthalocyanine is known (for example, refer to Patent Literature 1). The carbon material described in this literature is obtained by calcining hyperbranched metal phthalocyanine including a specific repeating unit in an inert gas atmosphere. The metal ion constituting phthalocyanine core of this repeating unit is selected from the group consisting of $Fe^{2+}$, $Co^{2+}$ and $Ni^{2+}$, thus is characterized in that it is not necessary to use expensive noble metal such as platinum.

Phthalocyanine is known to include many coordinating elements for fixing metal. Since phthalocyanine has a giant cyclic structure in which the whole molecule forms a conjugated double bond system, the structure and bonding thereof are extremely stable, and phthalocyanine coordinates with a metal ion such as transition metals at its center, and phthalocyanine forms a stable metal phthalocyanine complex. The advantages of using metal phthalocyanine as an electrode material include that it can stably fix metal, namely, it can be suggested that metal arrangement can be controlled at nano level. Furthermore, the advantages of using metal phthalocyanine as a precursor of a metal carrying carbon material include that the carbon content is high. Namely, when phthalocyanine is calcined to forma carbonized material, the carbon content of the electrode can be enhanced.

However, in the catalyst material described in Patent Literature 1, a constituent unit derived from phenols is required other than metal phthalocyanine, as described in the formula (I) of the paragraph 0023. Namely, hyperbranched metal phthalocyanine of Patent Literature 1 has a bonding in which the constituent unit derived from phenols is interposed (—O—Ar—O—) or a bonding in which it is not interposed (—O—) between adjacent metal phthalocyanines, thus lacks the regularity of metal arrangement. Also, it is preferred to have a simpler constituent unit, from the viewpoint of industrialization. On this point, there was a room for improvement on the compound described in Patent Literature 1.

In addition, as a more preferred method for search of a cooperative effect of a different metal, there was a room for improvement on the invention described in Patent Literature 1. More specifically, the hyperbranched metal phthalocyanine described in Patent Literature 1 contains only one type of metal phthalocyanine, thus cannot be used as a precursor compound for searching a cooperative effect of two or more types of metals.

Thus, the inventors have so far prepared a metal phthalocyanine derivative by condensation of a metal aminophthalocyanine compound and a metal carboxyphthalocyanine compound (for example, refer to Non Patent Literature 1). In this literature, the inventors have reported that a carbon material obtained by calcining the metal phthalocyanine derivative under specific conditions has a catalyst activity of oxygen reduction. As described above, the metal phthalocyanine derivative described in Non-Patent Literature 1 includes simple constituent unit in which metal is regularly arranged, and can be preferably used also for search of a cooperative effect of a different metal as necessary.

CITATION LIST

Patent Literature

Patent Literature 1: JP 2011-6283 A (claim 1, etc.)

Non Patent Literature

Non Patent Literature 1: Nobukatsu Nemoto, other 5, "Electrochemical Properties of Metal-Supported Carbon Catalysts Obtained by Calcination of Metal Phthalocyanine Derivatives", Polymer preprints, May 14, 2013, Vol. 62, No. 1

SUMMARY OF INVENTION

Technical Problem

In Non Patent Literature 1, a metal-supported carbon catalyst obtained by directly calcining a metal phthalocyanine derivative is used. However, in this calcination method, the oxygen reduction activity is not so high as compared to a conventional platinum-containing catalyst, and thus further improvement in catalyst efficiency has been expected.

An object of the present invention is to provide an electrode catalyst having high oxygen reduction activity and a method for producing the same.

Solution to Problem

In consideration of the above-mentioned circumstances, the present inventors have intensively investigated about an electrode catalyst material. As the result, the present inventors have found that a metal phthalocyanine polymer is calcined, then acid-treated to remove a part of the metal, and thereby the oxygen reduction activity of the obtained electrode catalyst is unexpectedly higher than before, and completed the present invention.

More specifically, the present invention relates to an electrode catalyst obtained by calcining a metal phthalocyanine polymer including a repeating structural unit obtained by the amide bonding of a structural unit represented by general formula (1a) to a structural unit represented by general formula (2a) to form a calcined body, then treating the calcined body with an acid.

[Chemical Formula 1]

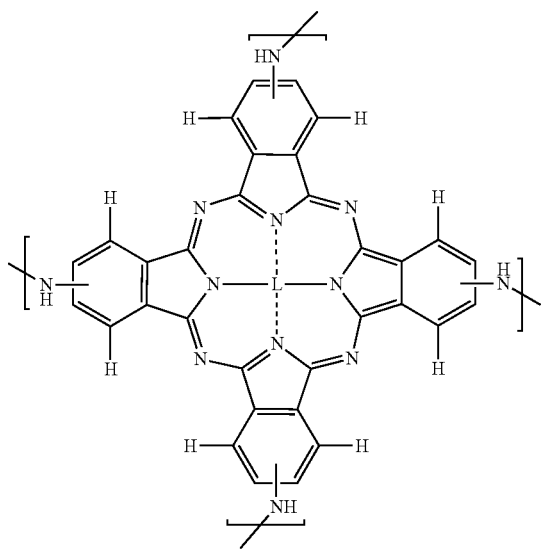

(1a)

(wherein L is a divalent or trivalent metal ion belonging to Period 3 to Period 5 on the long-form periodic table.)

[Chemical Formula 2]

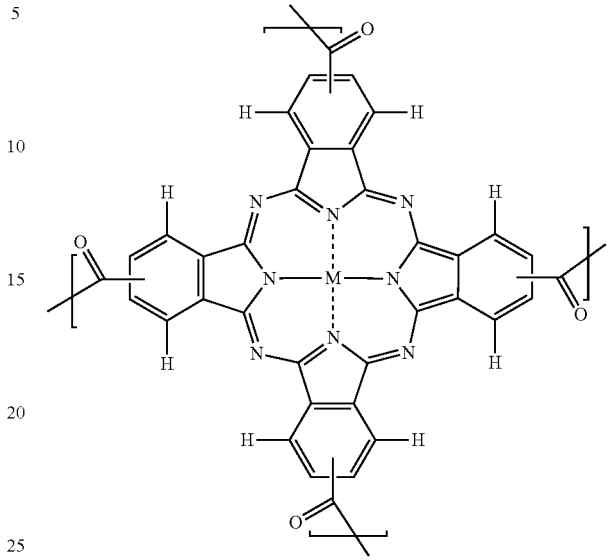

(2a)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, the acid is preferably at least one selected from the group consisting of dilute hydrochloric acid, concentrated hydrochloric acid, dilute sulfuric acid, concentrated sulfuric acid, dilute nitric acid, concentrated nitric acid, and aqua regia. Particularly, the acid is preferably aqua regia. In addition, it is preferred to remove at least apart of the metal by acid treatment. Specifically, it is preferred to remove 0.01 to 100% by weight of the metal by acid treatment. It is more preferred to remove 0.1 to 50% by weight of the metal by acid treatment. It is further preferred to remove 1 to 25% by weight of the metal by acid treatment. It is further preferred to remove 3 to 20% by weight of the metal by acid treatment. It is particularly preferred to remove 5 to 15% by weight of the metal by acid treatment.

Furthermore, it is preferred that the calcination is carried out at 650° C. to 1500° C., in a reducing gas atmosphere or an inert gas atmosphere. Particularly, it is preferred that the calcination is carried out at 800° C. to 1000° C., in a reducing gas atmosphere.

In addition, the present invention relates to an electrode catalyst including a calcined body obtained by calcining a metal phthalocyanine polymer including a repeating structural unit obtained by amide bonding of a structural unit represented by general formula (1a) to a structural unit represented by general formula (2a),

[Chemical Formula 3]

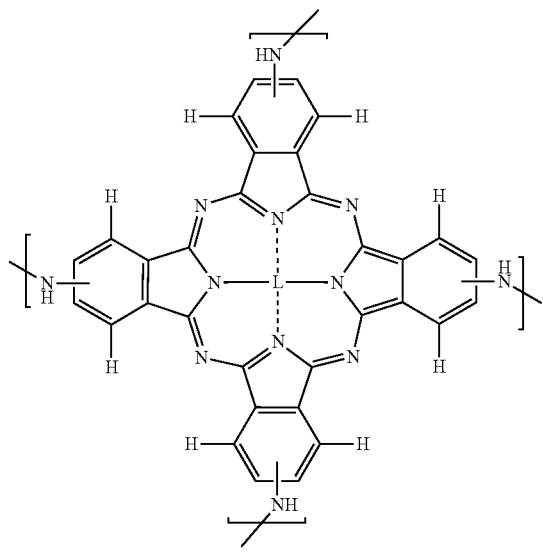

(1a)

(wherein L is a divalent or trivalent metal ion belonging to Period 3 to Period 5 on the long-form periodic table.)

[Chemical Formula 4]

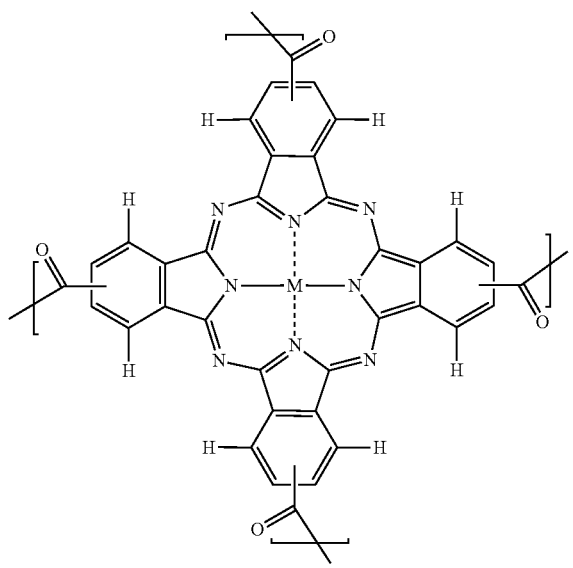

(2a)

(wherein M is a divalent or trivalent metal ion belonging to Period 3 to Period 5 on the long-form periodic table.)

wherein the ratio of the total amount of the L and the M is 0 to 99.99% by weight, based on the total amount of the L and the M contained in the metal phthalocyanine polymer before calcination.

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, it is more preferred that the ratio of the total amount of the L and the M is 50 to 99.9% by weight, based on the total amount of the L and the M contained in the metal phthalocyanine polymer before calcination. Moreover, it is further preferred that the ratio of the total amount of the L and the M is 75 to 99% by weight, based on the total amount of the L and the M contained in the metal phthalocyanine polymer before calcination. Furthermore, it is further preferred that the ratio of the total amount of the L and the M is 80 to 97% by weight, based on the total amount of the L and the M contained in the metal phthalocyanine polymer before calcination. Furthermore, it is particularly preferred that the ratio of the total amount of the L and the M is 85 to 95% by weight, based on the total amount of the L and the M contained in the metal phthalocyanine polymer before calcination.

Furthermore, it is preferred that the calcination is carried out at 650° C. to 1500° C., in a reducing gas atmosphere or an inert gas atmosphere. Particularly, it is preferred that the calcination is carried out at 800° C. to 1000° C., in a reducing gas atmosphere.

Also, the present invention relates to an electrode catalyst obtained by calcining a metal phthalocyanine polymer produced by condensation of a metal aminophthalocyanine compound represented by general formula (1) and a metal carboxyphthalocyanine compound represented by general formula (2), and then acid-treating it

[Chemical Formula 5]

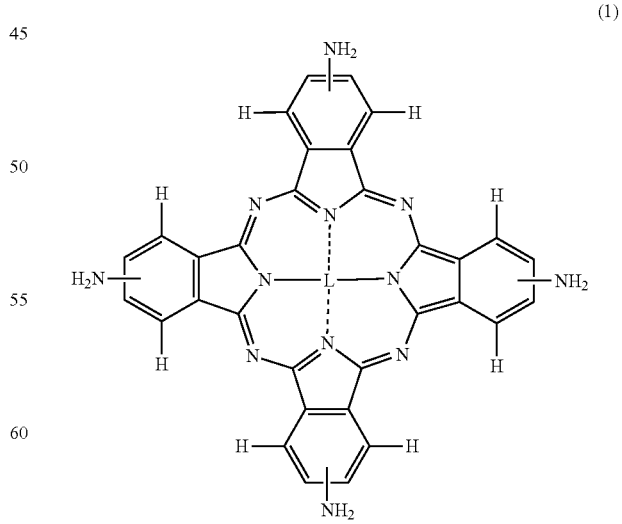

(1)

(wherein L is a divalent or trivalent metal ion belonging to Period 3 to Period 5 on the long-form periodic table.)

[Chemical Formula 6]

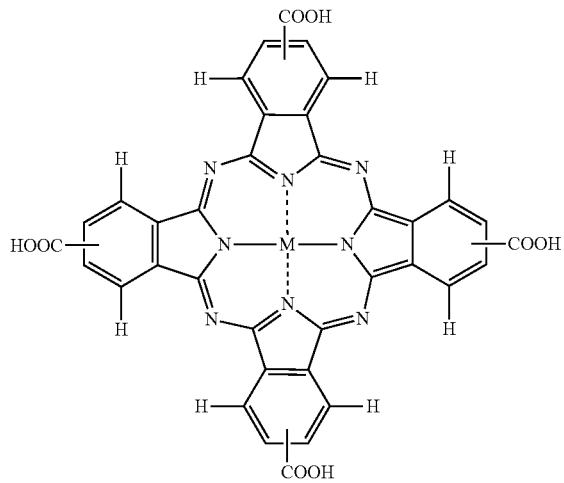

(2)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, the acid is preferably at least one selected from the group consisting of dilute hydrochloric acid, concentrated hydrochloric acid, dilute sulfuric acid, concentrated sulfuric acid, dilute nitric acid, concentrated nitric acid, and aqua regia. Particularly, the acid is preferably aqua regia. In addition, it is preferred to remove at least apart of the metal by acid treatment. Specifically, it is preferred to remove 0.01 to 100% by weight of the metal by acid treatment. It is more preferred to remove 0.1 to 50% by weight of the metal by acid treatment. It is further preferred to remove 1 to 25% by weight of the metal by acid treatment. It is further preferred to remove 3 to 20% by weight of the metal by acid treatment. It is particularly preferred to remove 5 to 15% by weight of the metal by acid treatment.

Furthermore, it is preferred that the calcination is carried out at 650° C. to 1500° C., in a reducing gas atmosphere or an inert gas atmosphere. Particularly, it is preferred that the calcination is carried out at 800° C. to 1000° C., in a reducing gas atmosphere.

Moreover, the present invention relates to an electrode catalyst including a calcined body obtained by calcining a metal phthalocyanine polymer produced by condensation of a metal aminophthalocyanine compound represented by general formula (1) and a metal carboxyphthalocyanine compound represented by general formula (2),

[Chemical Formula 7]

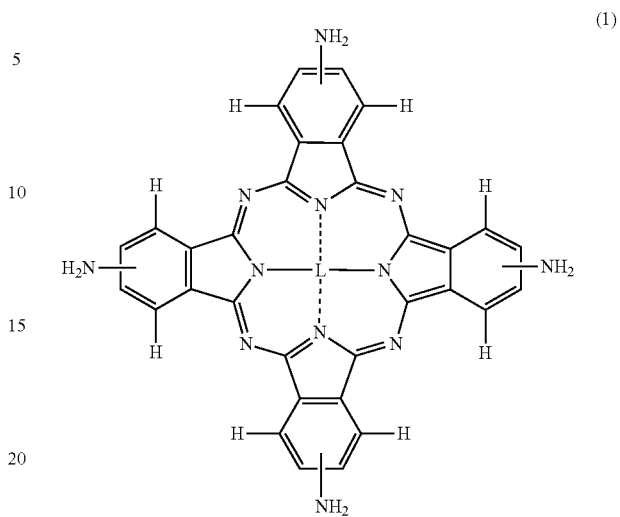

(1)

(wherein L is a divalent or trivalent metal ion belonging to Period 3 to Period 5 on the long-form periodic table.)

[Chemical Formula 8]

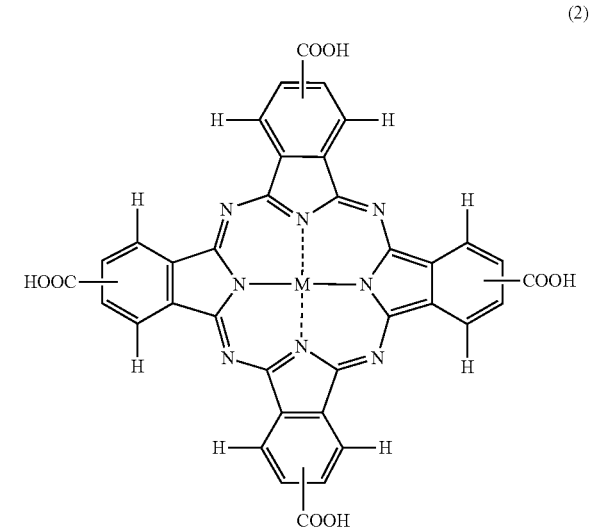

(2)

(wherein M is a divalent or trivalent metal ion belonging to Period 3 to Period 5 on the long-form periodic table.)

wherein the ratio of the total amount of the L and the M is 0 to 99.99% by weight, based on the total amount of the L and the M contained in the metal phthalocyanine polymer before calcination.

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, it is more preferred that the ratio of the total amount of the L and the M is 50 to 99.9% by weight, based on the total amount of the L and the M contained in the metal phthalocyanine polymer before calcination. Moreover, it is further preferred that the ratio of the total amount of the L and the M is 75 to 99% by weight, based on the total amount of the L and the M contained in the metal phthalocyanine polymer before calcination. Furthermore, it is further preferred that the ratio of the total amount of the L and the M is 80 to 97% by weight, based on the total amount of the L and the M contained in the metal phthalocyanine polymer before calcination. Furthermore, it is particularly preferred that the ratio of the total amount of the L and the M is 85 to 95% by weight, based on the total amount of the L and the M contained in the metal phthalocyanine polymer before calcination.

Furthermore, it is preferred that the calcination is carried out at 650° C. to 1500° C., in a reducing gas atmosphere or an inert gas atmosphere. Particularly, it is preferred that the calcination is carried out at 800° C. to 1000° C., in a reducing gas atmosphere.

In addition, the present invention relates to a method for producing an electrode catalyst including the steps of producing a metal phthalocyanine polymer including a repeating structural unit obtained by the amide bonding of a structural unit represented by general formula (1a) to a structural unit represented by general formula (2a), including condensing a metal aminophthalocyanine compound represented by general formula (1) and a metal carboxyphthalocyanine compound represented by general formula (2), calcining the metal phthalocyanine polymer to form a calcined body, and treating the calcined body with an acid.

[Chemical Formula 9]

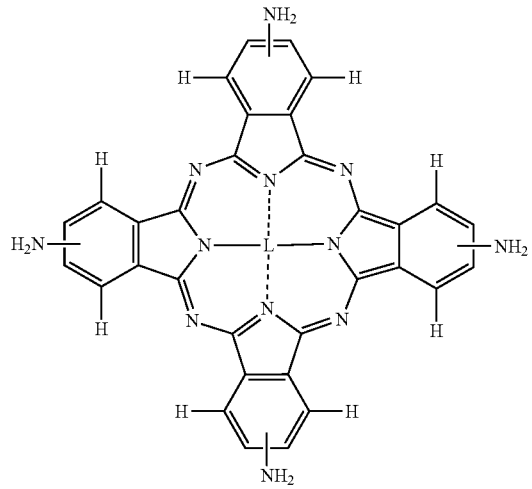

(1)

(wherein L is a divalent or trivalent metal ion belonging to Period 3 to Period 5 on the long-form periodic table.)

[Chemical Formula 10]

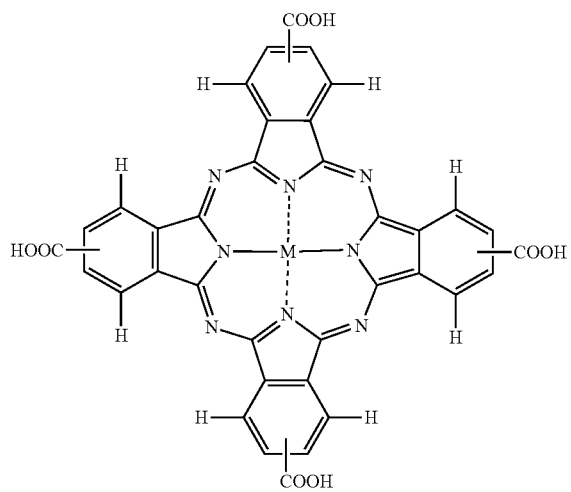

(2)

(wherein M is a divalent or trivalent metal ion belonging to Period 3 to Period 5 on the long-form periodic table.)

[Chemical Formula 11]

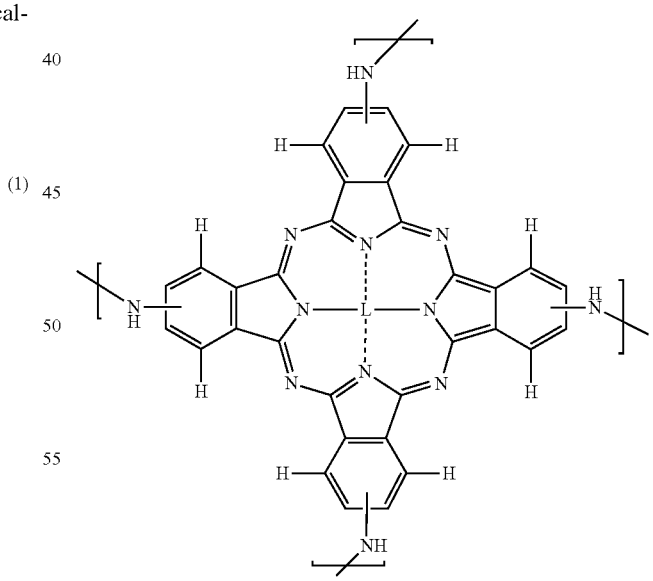

(1a)

(wherein L is a divalent or trivalent metal ion belonging to Period 3 to Period 5 on the long-form periodic table.)

[Chemical Formula 12]

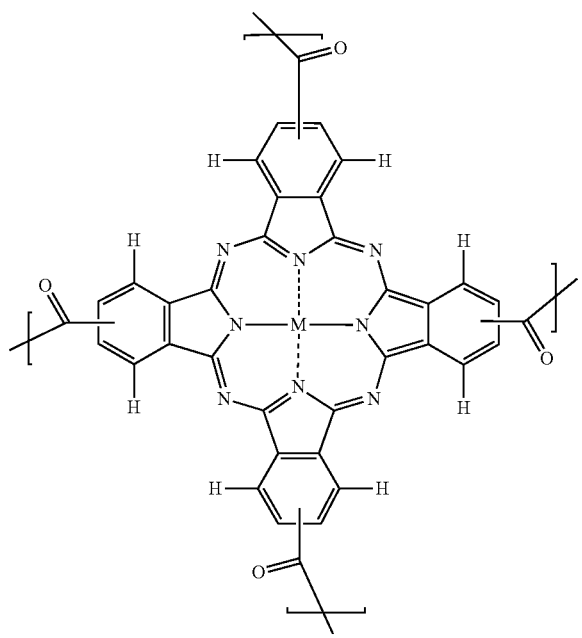

(2a)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, the acid is preferably at least one selected from the group consisting of dilute hydrochloric acid, concentrated hydrochloric acid, dilute sulfuric acid, concentrated sulfuric acid, dilute nitric acid, concentrated nitric acid, and aqua regia. Particularly, the acid is preferably aqua regia. In addition, it is preferred to remove at least apart of the metal by acid treatment. Specifically, it is preferred to remove 0.01 to 100% by weight of the metal by acid treatment. It is more preferred to remove 0.1 to 50% by weight of the metal by acid treatment. It is further preferred to remove 1 to 25% by weight of the metal by acid treatment. It is further preferred to remove 3 to 20% by weight of the metal by acid treatment. It is particularly preferred to remove 5 to 15% by weight of the metal by acid treatment.

Furthermore, it is preferred that the calcination is carried out at 650° C. to 1500° C., in a reducing gas atmosphere or an inert gas atmosphere. Particularly, it is preferred that the calcination is carried out at 800° C. to 1000° C., in a reducing gas atmosphere.

Advantageous Effects of Invention

As described above, according to the present invention, it is possible to provide an electrode catalyst having high oxygen reduction activity even without using expensive platinum and a method for producing the same.

BRIEF DESCRIPTION OF DRAWINGS

FIG. 1 is an IR spectrum of TNCoPc.
FIG. 2 (a) is a spectrum of IR, and FIG. 2 (b) is thermogravimetric analysis result of TACoPc.
FIG. 3 is an IR spectrum of TAmCoPc.
FIG. 4(a) is an IR spectrum, and FIG. 4 (b) is thermogravimetric analysis result of TCaCoPc.
FIG. 5 (a) is an IR spectrum, and FIG. 5 (b) is thermogravimetric analysis result of Poly(TACoPc-TCaCoPc).
FIG. 6 is a graph showing a result of testing electrodes prepared in Example 1 and Comparative Example 1 by a linear sweep voltammetry.
FIG. 7 is a graph showing a result of testing electrodes prepared in Example 2 and Comparative Example 2 by a linear sweep voltammetry.
FIG. 8 is a graph showing a result of testing electrodes prepared in Example 3 and Comparative Example 3 by a linear sweep voltammetry.
FIG. 9 is a graph showing a result of testing electrodes prepared in Examples 1 to 3 by a linear sweep voltammetry.
FIG. 10 is a graph showing a result of testing an electrode prepared in Example 1 and a normal electrode prepared by a platinum catalyst by a linear sweep voltammetry.

DESCRIPTION OF EMBODIMENTS

The electrode catalyst of the present invention is obtained by producing the following metal phthalocyanine polymer, subsequently calcining the metal phthalocyanine polymer to form a calcined body, then treating the calcined body with an acid. Hereinafter, the present invention will be described in detail.

1. Metal Phthalocyanine Polymer

The metal phthalocyanine polymer that is a precursor of the electrode catalyst of the present invention (hereinafter, simply referred to as "metal phthalocyanine polymer") has a repeating structural unit obtained by the amide bonding of a structural unit represented by general formula (1a) to a structural unit represented by general formula (2a).

[Chemical Formula 13]

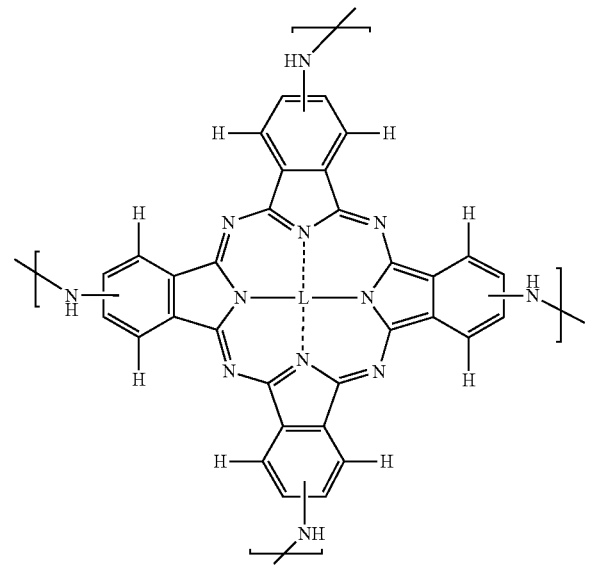

(1a)

(wherein L is a divalent or trivalent metal ion belonging to Period 3 to Period 5 on the long-form periodic table.)

[Chemical Formula 14]

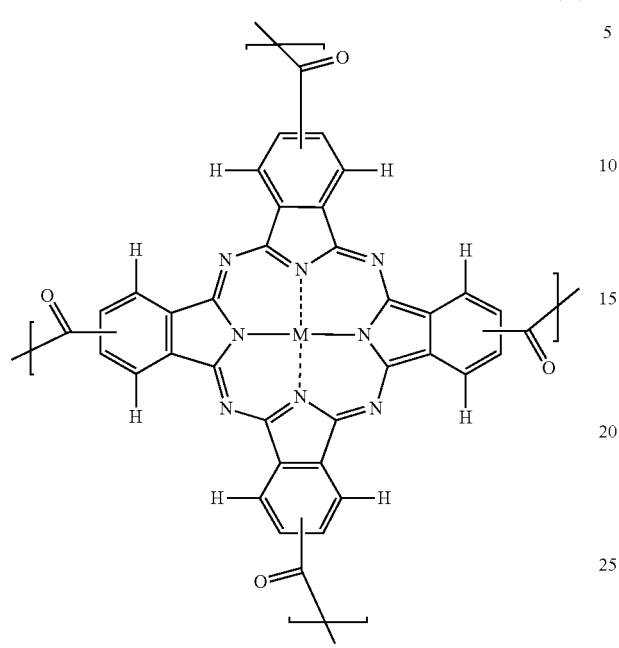

(2a)

(wherein M is a divalent or trivalent metal ion belonging to Period 3 to Period 5 on the long-form periodic table.)

As described above, the metal phthalocyanine polymer has a hyperbranched structure including a repeating unit of the general formula (1a) and a repeating unit of the general formula (2a) arranged alternately and repeatedly. Therefore, phthalocyanine cores M and L contained in each repeating unit are alternately arranged with regularity.

Here, the divalent metal ion constituting L and M includes $Mg^{2+}$, $Ca^{2+}$, $Sr^{2+}$, $Cd^{2+}$, $Ni^{2+}$, $Zn^{2+}$, $Cu^{2+}$, $Fe^{2+}$, $Co^{2+}$, $Sn^{2+}$, $Mn^{2+}$, and the like. Also, the trivalent metal ions include $Al^{3+}$, $Fe^{3+}$, $Cr^{3+}$, and the like. As described above, since a noble metal such as platinum is not used in the present invention, it is possible to provide an inexpensive metal phthalocyanine polymer.

Among them, it is preferred that L and M are each independently a metal ion selected from the group consisting of $Co^{2+}$, $Ni^{2+}$ and $Fe^{2+}$. These three types of metal ions are a transition metal, can form a complex with various ligands, are relatively easily available and inexpensive, have low toxicity, and are excellent more than other metal ions based on these reasons, thus are preferred. Particularly, it is preferred that L and M are $Co^{2+}$, L is $Co^{2+}$ and M is $Ni^{2+}$, or L is $Co^{2+}$ and M is $Fe^{2+}$. As described above, L and M are different metals, and thereby, when the metal phthalocyanine polymer is calcined to form a carbon electrode material as described below, it is possible to search a cooperative effect of a different metal. In addition, the electrode catalyst contains a different metal, thereby obtaining a mixing effect of a different metal generally observed in an organic chemistry catalytic reaction, as compared with the case of containing only one type of metal, thus is preferred.

2. Method for Producing Metal Phthalocyanine Polymer

The metal phthalocyanine polymer can be produced by synthesizing a metal aminophthalocyanine compound represented by general formula (1) (Step 1), and in parallel with this, synthesizing a metal carboxyphthalocyanine compound represented by general formula (2) (Step 2), and condensing the obtained metal aminophthalocyanine compound and the obtained metal carboxyphthalocyanine compound (Step 3). Hereinafter, each step will be described in detail.

[Chemical Formula 15]

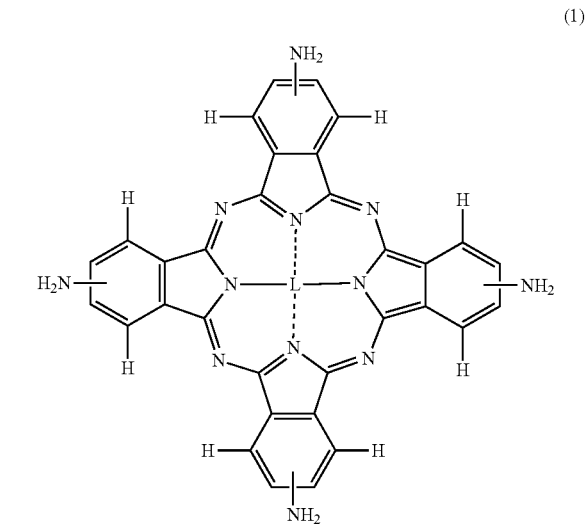

(1)

(wherein L is a divalent or trivalent metal ion belonging to Period 3 to Period 5 on the long-form periodic table.)

[Chemical Formula 16]

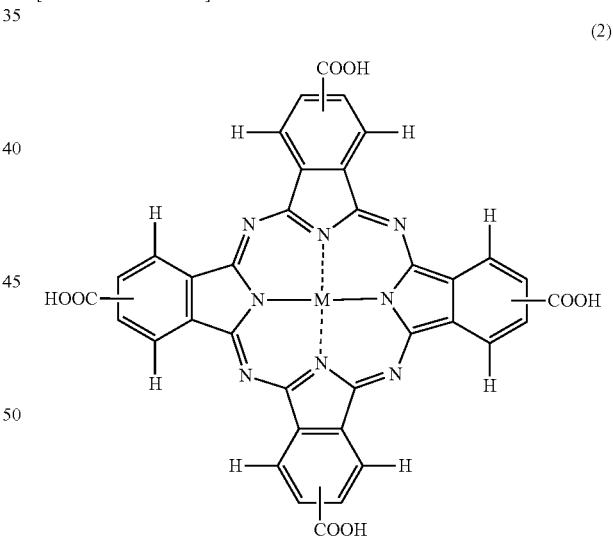

(2)

(wherein M is a divalent or trivalent metal ion belonging to Period 3 to Period 5 on the long-form periodic table.)

(1) Synthesis of Metal Aminophthalocyanine Compound (Step 1)

The metal aminophthalocyanine compound represented by the general formula (1) can be synthesized by synthesizing a metal nitrophthalocyanine compound (Step 1-1) and reducing a nitro group of the synthesized metal nitrophthalocyanine compound into an amino group (Step 1-2). Hereinafter, these steps will be described in detail.

(1-1) Production of Metal Nitrophthalocyanine Compound (Step 1-1)

The metal nitrophthalocyanine compound represented by the following general formula (4) can be produced by reacting a 4-nitrophthalic acid represented by the following general formula (3), or an acid anhydride thereof, an imide thereof or the like, with a metal salt including the L, urea, and catalyst, in the presence of a solvent, as necessary. Examples of the metal salt including the L include cobalt(II) chloride, nickel(II) chloride, iron(II) chloride, and the like. Examples of the catalyst include ammonium molybdate, and the like. Examples of the solvent include nitrobenzene, trichlorobenzene, triglyme, and the like. The reaction temperature and the reaction time can appropriately be set, for example, at 150 to 230° C., and 4 to 12 hours. As a method for synthesizing a metal nitrophthalocyanine, for example, JP 11-56989 A, JP 10-101673 A, JP 53-75223 A and the like can be referred.

[Chemical Formula 17]

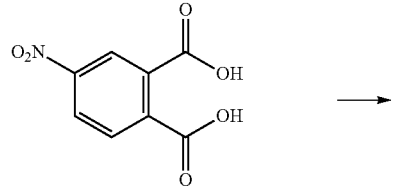

(3)

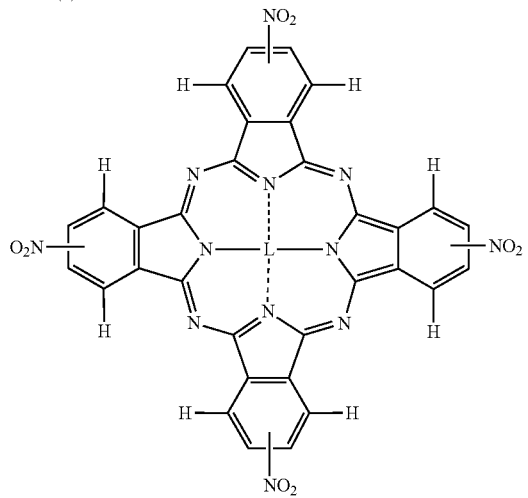

(4)

(1-2) Production of Metal Aminophthalocyanine Compound (Step 1-2)

The metal aminophthalocyanine represented by the following general formula (1) can be produced by reducing a nitro group of the metal nitrophthalocyanine represented by the following general formula (4). The reduction can be performed using a reducing agent and, as appropriate, a solvent. Examples of the reducing agent include sodium sulfide ($Na_2S$, $Na_2S_2$, etc.), sodium hydrosulfide, sodium dithionite, ammonium sulfide, and the like. In this case, the solvent includes water, and water also serves as a proton source. The reaction temperature and the reaction time can appropriately be set, for example, at 50 to 80° C., and 4 to 12 hours. As a method for synthesizing a metal aminophthalocyanine, for example, JP 11-56989 A, "Shin-Jikken Kagaku Koza 14, Synthesis and Reaction of Organic Compound III, pages 1332 to 1335, (1978), MARUZEN CO., LTD." and the like can be referred.

[Chemical Formula 18]

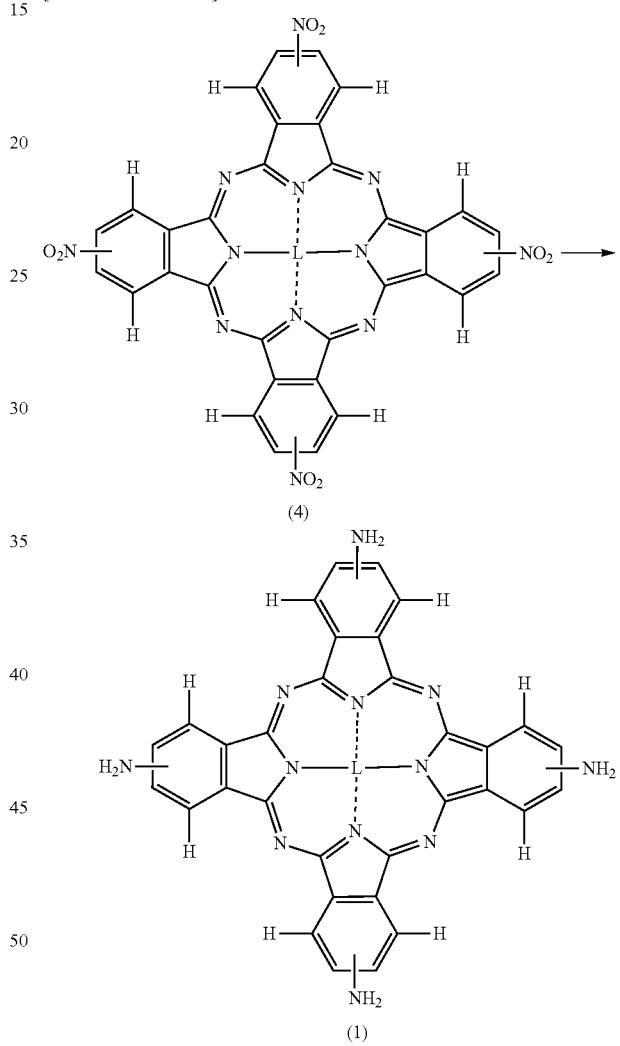

(2) Synthesis of Metal Carboxyphthalocyanine Compound (Step 2)

The metal carboxyphthalocyanine compound represented by the general formula (2) can be synthesized by synthesizing a metal carboxamidephthalocyanine compound (Step 2-1) and hydrolyzing a carboxamide group of the synthesized metal carboxamidephthalocyanine compound (Step 2-2). Hereinafter, these steps will be described in detail.

(2-1) Production of Metal Carboxamidephthalocyanine Compound (Step 2-1)

The metal carboxamidephthalocyanine compound represented by the following general formula (6) can be produced by reacting a trimellitic acid anhydride represented by the following general formula (5), with a metal salt including the M, urea, and catalyst, in the presence of a solvent, as necessary. Examples of the metal salt including the M include cobalt(II) chloride, nickel(II) chloride, iron(II) chloride, and the like. Examples of the catalyst include ammonium molybdate, and the like. Examples of the solvent include nitrobenzene, trichlorobenzene, triglyme, and the like. The reaction temperature and the reaction time can appropriately be set, for example, at 150 to 230° C., and 4 to 12 hours. As a method for synthesizing a metal carboxamidephthalocyanine, for example, JP 11-56989 A, JP 10-101673 A, JP 53-75223 A and the like can be referred.

[Chemical Formula 19]

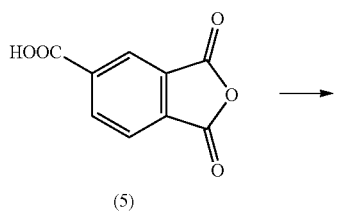

(5)

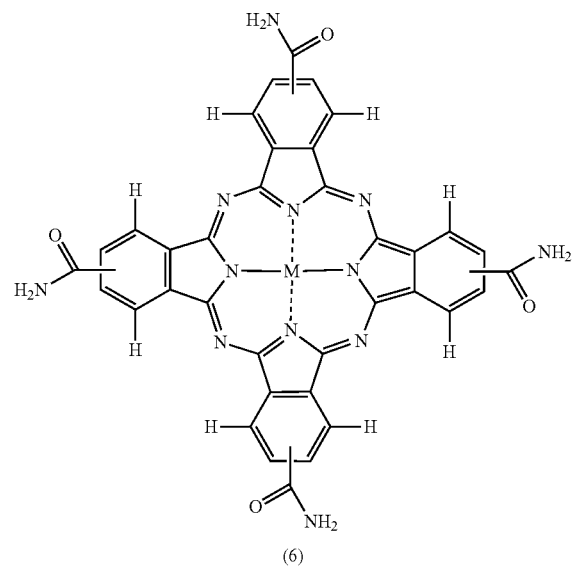

(6)

(2-2) Production of Metal Carboxyphthalocyanine Compound (Step 2-2)

The metal carboxyphthalocyanine compound represented by the following general formula (2) can be produced by hydrolyzing a carboxamide group of the metal carboxamidephthalocyanine represented by the following formula (6). Hydrolysis can be performed by a method usually used by a person skilled in the art. Hydrolysis can be performed using, for example, an aqueous alkali solution such as an aqueous potassium hydroxide solution and an aqueous sodium hydroxide solution. The reaction temperature and the reaction time can appropriately be set, for example, at 80 to 120° C., and 20 to 30 hours. As a method for synthesizing a metal carboxyphthalocyanine, for example, JP 11-56989 A, "Shin-Jikken Kagaku Koza 14, Synthesis and Reaction of Organic Compound II, pages 943 to 947, (1977), MARUZEN CO., LTD." and the like can be referred.

[Chemical Formula 20]

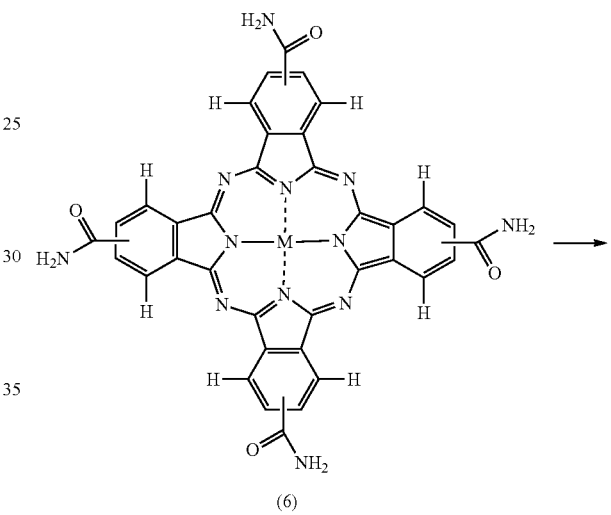

(6)

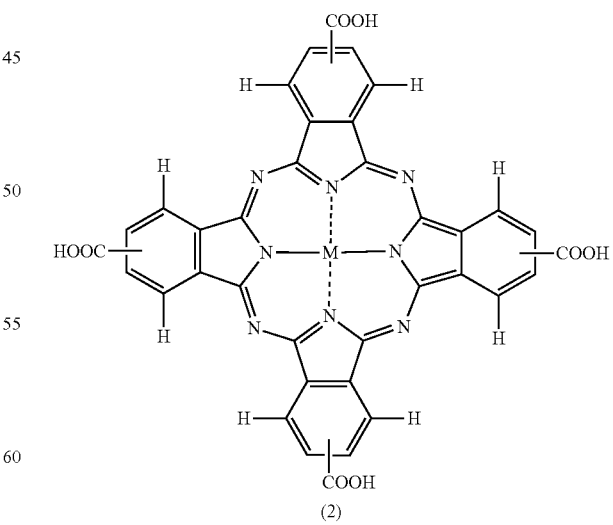

(2)

(3) Production of Metal Phthalocyanine Polymer (Step 3)

The metal phthalocyanine polymer compound represented by the following general formula (7) can be produced by forming an amide bonding between the amino group of the metal aminophthalocyanine compound represented by the following general formula (1) and the carboxyl group of the metal carboxyphthalocyanine compound represented by the following general formula (2). The condensation reaction is preferably performed in the presence of a condensing agent. Examples of the condensing agent include triphenyl phosphite, but are not limited thereto. When triphenyl phosphite is used as a condensing agent, pyridine is preferably used. Furthermore, when triphenyl phosphite is used as a condensing agent, metal salts such as lithium chloride and calcium chloride can be added. The condensation reaction can be performed in the presence of a solvent. The solvent used in the condensation reaction includes dimethylformamide (DMF), N-methyl pyrrolidone (NMP), and the like.

The use ratio of the metal aminophthalocyanine compound represented by the following general formula (1) and the metal carboxyphthalocyanine compound represented by the following general formula (2) can appropriately be set, and as the use ratio, for example, the ratio (a)/(b) of the molar number of the used metal aminophthalocyanine compound (a) and the molar number of the used metal carboxyphthalocyanine compound (b) is 0.8 to 1.2, preferably 0.9 to 1.1, and more preferably 1. When triphenyl phosphite is used as a condensing agent, the use amount of triphenyl phosphite can appropriately be set, and examples of the use amount of triphenyl phosphite are the range of 2 to 40 mol, preferably 4 to 30 mol, more preferably 10 to 30 mol, and further preferably 15 to 25 mol, based on 1 mol of the metal aminophthalocyanine compound represented by the following general formula (1). When triphenyl phosphite is used as a condensing agent, the use amount of pyridine can appropriately be set, and examples of the use amount of pyridine are the range of 6 to 120 mol, preferably 12 to 90 mol, more preferably 30 to 90 mol, and further preferably 45 to 75 mol, based on 1 mol of the metal aminophthalocyanine compound represented by the following general formula (1). Also, pyridine can be used and also serves as a solvent, regardless of the use amount exemplified herein. When triphenyl phosphite is used as a condensing agent, the use amount of the metal salts such as lithium chloride and calcium chloride can appropriately be set, and examples of the use amount thereof are the range of 0 to 50 mol, preferably 10 to 40 mol, and more preferably 20 to 30 mol, based on 1 mol of the metal aminophthalocyanine compound represented by the following general formula (1).

The use amount of the solvent can appropriately be set, and examples of the use amount of the solvent are the range of 0.5 to 100 L (liter), preferably 5 to 50 L, and more preferably 10 to 30 L, based on 1 mol of the metal aminophthalocyanine compound represented by the following general formula (1). The reaction temperature can appropriately be set, and the reaction temperature can be set, for example, to the range of 50 to 180° C., preferably 80 to 150° C., and more preferably 80 to 120° C. The reaction time can appropriately be set, and the reaction time can be set, for example, to 1 to 48 hours, preferably 1 to 24 hours, more preferably 1 to 12 hours, and further preferably 2 to 5 hours. As a condensation reaction, for example, "Journal of Organic Chemistry Vol. 71, (2006) p. 2874 to 2877", "Organic Letters Vol. 7, No. 9, (2005) p. 1737 to 1739", "Shin-Jikken Kagaku Koza 14, Synthesis and Reaction of Organic Compound II, pages 1136 to 1141, (1977), MARUZEN CO., LTD." and the like can be referred.

[Chemical Formula 21]

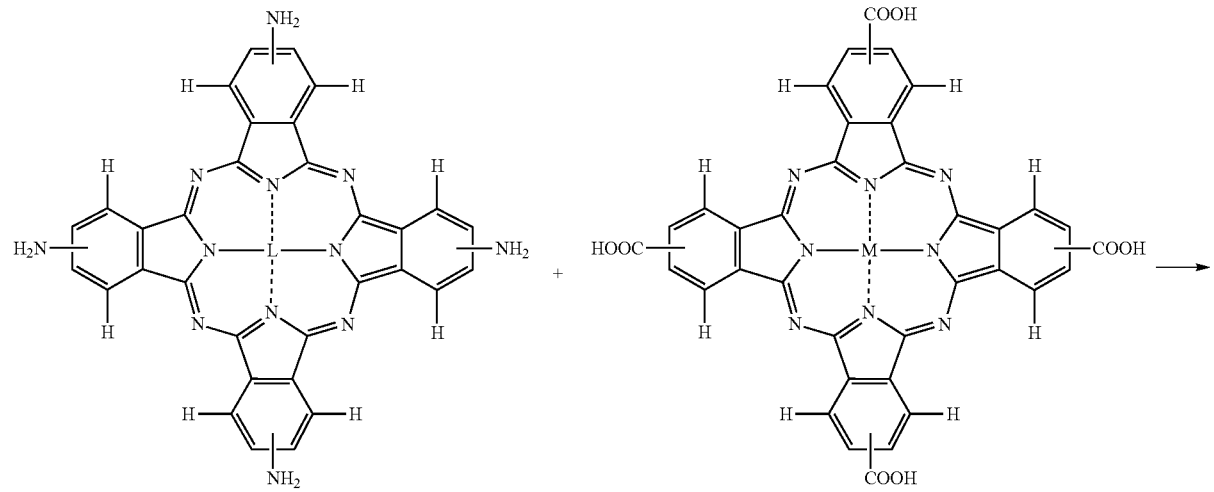

-continued

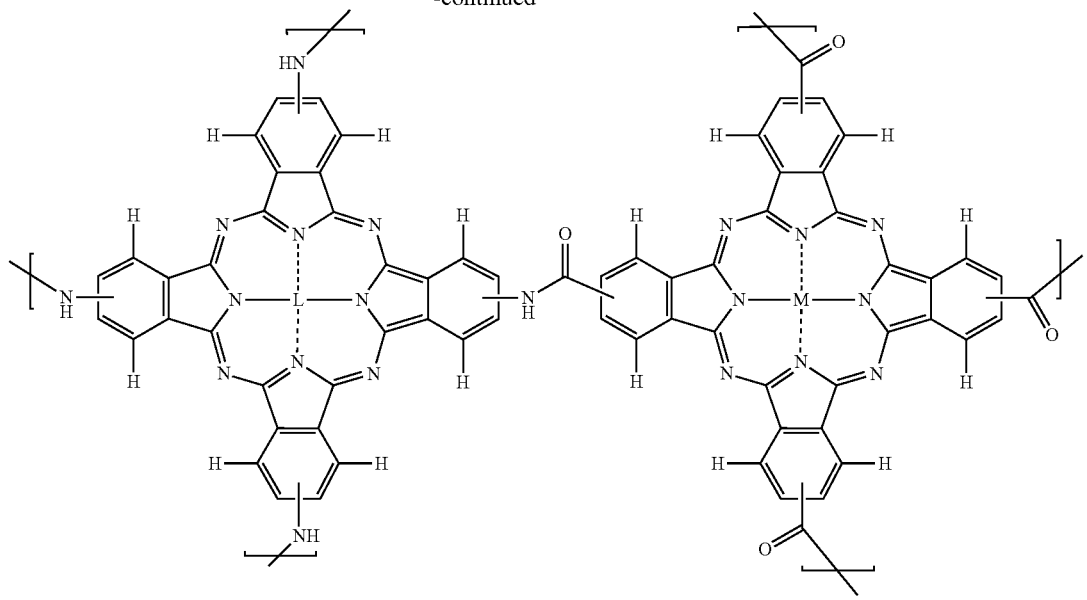

(7)

The metal phthalocyanine polymer obtained as above has a repeating structural unit obtained by amide bonding of a structural unit represented by the general formula (1a) to a structural unit represented by the general formula (2a) as described above, and is presumed to have a structure as the general formula (7), namely have an amide structure.

3. Electrode Catalyst

The electrode catalyst of the present invention (hereinafter, simply referred to as "electrode catalyst") can be obtained by heating and calcining the above metal phthalocyanine polymer as a precursor to carbonize it, and further, acid-treating the obtained calcined body to remove at least a part of the metal contained in the calcined body (metal derived from the L and M). The electrode catalyst shows high oxygen reduction activity, and can be suitably used as an electrode material of a fuel cell. Since the metal phthalocyanine polymer does not use platinum as described above, the electrode catalyst obtained by carbonizing it also does not contain platinum, thus is inexpensive. Also, the metal phthalocyanine polymer has a high carbon content, and has a phthalocyanine skeleton regularly bound, thus the obtained electrode catalyst also has a high carbon content, and is excellent in metal dispersibility. Furthermore, one metal L and other metal M of the metal phthalocyanine polymer are different metals, and thereby it is possible to incorporate two types of metals into the electrode catalyst and diversify characteristics of the electrode catalyst. Therefore, it is useful in searching an electrode catalyst having more excellent characteristics.

In addition, at least a part of the metal contained in the calcined body is removed, and thereby the electrode catalyst has high oxygen reduction activity, as compared to a calcined body in which the metal is not removed. Also, the electrode catalyst shows a rapid rising to the current peak, and becomes a more highly active electrode, as compared to the electrode catalyst in which the metal is not removed.

Moreover, the electrode catalyst can be produced by removing the metal from the calcined body, and the removed metal can be also purified and reused.

4. Method for Producing Electrode Catalyst

The method for producing an electrode catalyst of the present invention includes the steps of producing the above metal phthalocyanine polymer, calcining the metal phthalocyanine polymer to form a calcined body (calcination step), and acid-treating the obtained calcined body (acid treatment step).

(1) Calcination Step

A calcined body can be produced by calcining a metal phthalocyanine polymer. The heating temperature on calcination is 650 to 1500° C., preferably 800 to 1000° C., and particularly preferably 850° C. to 950° C. When the calcination temperature is below 650° C., calcination is insufficient, and oxygen reduction activity is unlikely to be expressed, thus is not preferred. Also, when the calcination temperature is above 1500° C., the calcination temperature is too high, thus the structure of carbon is broken, and oxygen reduction activity is unlikely to be expressed, thus is not preferred by reason of the reduction of yield. As the calcination time, 0.1 to 12 hours can be exemplified, and the calcination time is preferably 0.5 to 6 hours, more preferably 1 to 5 hours, and particularly preferably 2 to 4 hours.

Calcination is preferably performed in a reducing gas atmosphere or an inert gas atmosphere, and particularly preferably performed in a reducing gas atmosphere, based on the reason that metal can be reduced during calcination. The reducing gas includes hydrogen, carbon monooxide, hydrogen sulfide, and the like. Also, the inert gas includes nitrogen, argon, and the like. The oxygen concentration in these gases is preferably 100 ppm or less, more preferably 20 ppm or less, and particularly preferably 10 ppm or less, on the volume basis. As to calcination, JP 2011-6283 A, JP 2009-57314 A and the like can be referred.

(2) Acid Treatment Step

The obtained calcined body is acid-treated, and thereby at least a part of the metal contained in the calcined body is eluted to be removed from the calcined body. Specifically, it is preferred to remove 0.01 to 100% by weight of the metal by acid treatment. It is more preferred to remove 0.1 to 50% by weight of the metal by acid treatment. It is further preferred to remove 1 to 25% by weight of the metal by acid treatment. It is further preferred to remove 3 to 20% by weight of the metal by acid treatment. It is particularly preferred to remove 5 to 15% by weight of the metal by acid treatment. Therefore, the total amount of the metals in the electrode catalyst is preferably 0 to 99.99% by weight, more preferably 50 to 99.9% by weight, further preferably 75 to 99% by weight, further preferably 80 to 97% by weight, and particularly preferably 85 to 95% by weight, based on the total amount of the metals contained in the metal phthalocyanine polymer before calcination.

The "metal" herein includes a meaning of "metal ion". Herein, the metal to be removed by acid treatment (for example, metal ion) can be calculated based on the metal amount (for example, metal ion amount) in the calcined body before acid treatment, assuming that the metal phthalocyanine polymer used in the calcination step is a dimer of phthalocyanine obtained by condensation of one compound of the general formula (1) and one compound of the general formula (2), and further assuming that the metal (for example, metal ion) does not decrease in the calcination step.

The used acid is not particularly limited as long as it can elute metal and has low reactivity with carbon, and for example, at least one selected from the group consisting of dilute hydrochloric acid, concentrated hydrochloric acid, dilute sulfuric acid, concentrated sulfuric acid, dilute nitric acid, concentrated nitric acid, and aqua regia is preferred. These acids can be properly selected, according to the ionization tendency of the metal to be eluted. Among the above acids, aqua regia (concentrated nitric acid:concentrated hydrochloric acid=1:3 (volume ratio)) that has strong oxidizing power and reacts with various metals to ionize the metals is particularly preferred.

When performing acid treatment, it is preferred to pulverize the calcined body in advance. Also, during acid treatment, it is preferred to continuously perform ultrasonic treatment or the like to pulverize the calcined body or disperse the calcined body in the solution. Treatment such as pulverization is performed as described above, thereby promoting elution of the metal by an acid, thus is preferred.

The temperature of the acid treatment is usually within the range of 0 to 80° C., preferably within the range of 2 to 70° C., more preferably within the range of 5 to 60° C., more preferably within the range of 7 to 50° C., further preferably within the range of 10 to 40° C., and particularly preferably within the range of 15 to 35° C. The time of the acid treatment is usually within the range of 1 minute to 5 hours, preferably within the range of 10 minutes to 3 hours, and more preferably within the range of 20 minutes to 1 hour. The conditions such as temperature and time of the acid treatment can be properly changed according to the kind of the metal contained in the calcined body and the kind of the acid, the dispersion state in the treatment solution, and the like.

The use amount of the acid in the acid treatment can appropriately be set, and examples of the use amount of the acid are the range of 0.5 to 100 L (liter), preferably 1 to 50 L, more preferably 2 to 40 L, further preferably 3 to 30 L, and particularly preferably 3 to 20 L, based on 1 kg of the calcined body.

The electrode catalyst after acid treatment can be formed into a catalyst carrying electrode, by being applied to the surface of an electrode material such as glassy carbon, or the like. The electrode catalyst is preferably applied after being dispersed by ultrasonic wave or the like, in the presence of a solvent or a dispersing agent. The concentration of the dispersing agent is usually 0.5 to 20% by weight or so, and preferably 1 to 10% by weight or so. As the method of application, other than the method of simply adding a dispersed solution dropwise, a method using a known apparatus such as a screen printer, a roll coater or a gravure coater may be used. After application, the electrode catalyst is dried for several hours to several days at ordinary temperature or high temperature.

EXAMPLES

Hereinafter, the present invention is specifically described with reference to Examples, but these Examples do not limit the object of the present invention.

1. Example 1 (Synthesis of Poly(Tetraamino Cobalt Phthalocyanine-Tetracarboxy Cobalt Phthalocyanine))

(1) Synthesis of Tetranitro Cobalt Phthalocyanine (Compound of General Formula (4))

A 500-ml recovery flask was charged with 10.051 g (0.048 mol) of 4-nitrophthalic acid, 4.001 g (0.031 mol) of cobalt chloride, 30.004 g (0.500 mol) of urea, 1.041 g (0.005 mol) of ammonium molybdate and 150 ml of nitrobenzene, and the mixture was stirred at 180° C. for 8 hours. After the completion of the reaction, the mixture was washed by filtration using methanol, and boiled in 350 ml of an aqueous 1 N HCl solution (NaCl saturated). After cooling overnight, the solution was washed by filtration using pure water and methanol, and dried at 80° C. under reduced pressure. This operation was repeated twice. The resulting solid was boiled in 200 ml of pure water, and after cooling, the solid was washed by filtration using methanol, and dried at 80° C. under reduced pressure. This operation was repeated twice to obtain tetranitro cobalt phthalocyanine (TNCoPc) that was deep blue powder. The yield of the obtained TNCoPC was 9.640 g. 1 mol of TNCoPc as the object can be theoretically produced from 4 mol of 4-nitrophthalic acid as the raw material. Therefore, the yield of TNCoPc was 108% of the theoretical amount calculated from the used 4-nitrophthalic acid. FIG. 1 illustrates an IR spectrum of TNCoPc.

(2) Synthesis of Tetraamino Cobalt Phthalocyanine (Compound of General Formula (1))

In a 500-ml recovery flask, 5.004 g of the obtained TNCoPc, 25.000 g (0.104 mol) of sodium sulfide and 150 ml of pure water were mixed, and the mixture was stirred at 65° C. for 8 hours. After the completion of the reaction, the mixture was washed by filtration using pure water and methanol, and boiled using a 5% aqueous sodium hydroxide solution. After cooling, the solution was washed by filtration using pure water and methanol, and dried at 80° C. under reduced pressure. Thereafter, the resulting TACoPc was dissolved in 1 N HCl, and the solution was filtered. The filtered solution was adjusted to a pH of 8 by adding an aqueous KOH solution, and boiled. After cooling, the solution was washed by filtration using pure water and methanol. The collected solid was dried at 80° C. under reduced pressure. This operation was repeated twice to obtain tetraamino cobalt phthalocyanine (TACoPc) that was deep blue solid. The yield of the obtained TACoPc was 1.493 g. 1 mol of TACoPc as the object can be theoretically produced from 1 mol of TNCoPc as the raw material. Therefore, the yield of TACoPc was 36% of the theoretical amount calculated from the used TNCoPc. FIG. 2 illustrates an IR spectrum and thermogravimetric analysis result of TACoPc.

(3) Synthesis of Tetracarboxamide Cobalt Phthalocyanine (Compound of General Formula (6))

A 500-ml recovery flask was charged with 10.004 g (0.052 mol) of a trimellitic acid anhydride, 4.010 g (0.031 mol) of cobalt chloride, 30.032 g (0.500 mol) of urea, 1.004 g (0.005 mol) of ammonium molybdate and 150 ml of nitrobenzene, and the mixture was stirred at 180° C. for 8 hours. After the completion of the reaction, the precipitate was washed by filtration using methanol and diethyl ether, and boiled in an aqueous 1 N HCl solution (NaCl saturated). After cooling overnight, the precipitate was washed by filtration using pure water, ethanol, and diethyl ether. The obtained solid was dried at 60° C. under reduced pressure. This operation was repeated twice to obtain tetracarboxamide cobalt phthalocyanine (TAmCoPc) that was blue green powder. The yield of the obtained TAmCoPc was 9.6732 g. 1 mol of TAmCoPc as the object can be theoretically produced from 4 mol of the trimellitic acid anhydride as the raw material. Therefore, the yield of TAmCoPc was 100% of the theoretical amount calculated from the used trimellitic acid anhydride. FIG. 3 illustrates an IR spectrum of TAmCoPc.

(4) Synthesis of Tetracarboxy Cobalt Phthalocyanine (Compound of General Formula (2))

In a 500-ml recovery flask, 9.640 g of TAmCoPc, 60 g of KOH and 60 ml of pure water were stirred at 100° C. for 24 hours. After the completion of the reaction, the mixture was adjusted to a pH of 2 by adding 100 ml of pure water and concentrated HCl, and filtered. The obtained solid was washed by filtration using pure water, ethanol and diethyl ether, and added to 200 ml of pure water, and the mixture was adjusted to a pH of 10 using an aqueous 0.1 N KOH solution to filter a dissolved matter. The filtrate was adjusted to a pH of 2 by adding concentrated hydrochloric acid, and washed by filtration using pure water, ethanol, and diethyl ether. The obtained solid was dried at 100° C. under reduced pressure. This operation was repeated twice to obtain tetracarboxy cobalt phthalocyanine (TCaCoPc) that was purplish-red solid. The yield of the obtained TCaCoPc was 7.5740 g. 1 mol of TCaCoPc as the object can be theoretically produced from 1 mol of TAmCoPc as the raw material. Therefore, the yield of TCaCoPc was 78% of the theoretical amount calculated from the used TAmCoPc. FIG. 4 illustrates an IR spectrum and thermogravimetric analysis result of TCaCoPc.

(5) Synthesis of Poly(Tetraamino Cobalt Phthalocyanine-Tetracarboxy Cobalt Phthalocyanine) (Compound of General Formula (7))

A 50-ml two-necked flask was charged with 0.3457 g (0.5 mmol) of TACoPc, 0.4065 g (0.5 mmol) of TCaCoPc, 2.618 ml (10 mmol) of triphenyl phosphite, 0.5034 g (12 mmol) of lithium chloride, 10 ml of DMF and 2.5 ml of pyridine, and the mixture was stirred at 100° C. for 3 hours, in an argon atmosphere. The product was filtered, and washed with methanol and DMF. After washing, the product was dried at 80° C. under reduced pressure to obtain poly(tetraamino cobalt phthalocyanine-tetracarboxy cobalt phthalocyanine) (Poly(TACoPc-TCaCoPc)) that was deep blue solid. The yield of the obtained Poly(TCaCoPc-TACoPc) was 0.7034 g. FIG. 5 illustrates an IR spectrum and thermogravimetric analysis result of Poly(TACoPc-TCaCoPc).

(6) Preparation of Electrode Catalyst and Electrode (a) Preparation of Calcined Body For the preparation of the electrode, a method of Ozaki et al. (J. Ozaki et al./Carbon 45 (2007) 1847 to 1853) was applied. First, 0.669 g of the obtained Poly(TACoPc-TCaCoPc) was weighed, and left in an argon flow for an hour using a ceramic electric tubular furnace ARF-30KC, then calcined in a hydrogen flow for 3 hours. The calcination temperature was set at 900° C. After the completion of calcination, the substance was cooled in an argon flow, and the residual solid (calcined body) was collected. The collected sample was pulverized in a mortar and passed through a 200-mesh sieve so as to have a particle size of 30 µm or less. The yield was calculated from the weight of Poly (TACoPc-TCaCoPc) before calcination and the weight of Poly(TACoPc-TCaCoPc) after calcination. The yield was 33%.

(b) Acid Treatment 0.3 g of the sample was weighed and put into a 10 ml microtube, 2.5 ml of aqua regia was added thereto, and the microtube was irradiated with ultrasonic waves for 30 minutes, then left for a whole day and night. Subsequently, the solution containing the metal was filtered with a 1.0 µm membrane filter (manufactured by Toyo Roshi Kaisha, Ltd.), and the electrode catalyst was separated to form an ink-like solution. When the filtrate was analyzed by ICP-AES, cobalt was detected, thus it could be confirmed that a part of the metal contained in the calcined body was eluted. Furthermore, the amount of cobalt in the filtrate (i.e., aqua regia used in the acid treatment) was 6.86 mg. Assuming that Poly(TACoPe-TCaCoPe) obtained in the (a) is a dimer of phthalocyanine obtained by condensation of one compound of the general formula (1) and one compound of the general formula (2), it was calculated that 8.7% of cobalt was removed by acid treatment, based on the metal amount (for example, amount of metal ion) in the calcined body before acid treatment. Namely, the value was calculated by the following formula.

Ratio of cobalt removed by acid treatment=Amount of cobalt in aqua regia/Amount of cobalt in calcined body Amount of cobalt in calcined body=Amount of calcined body×Content of cobalt in calcined body Content of cobalt in calcined body=Atomic weight of cobalt×2/Yield on preparing calcined body× Molecular weight of dimer)

Here, the value was calculated assuming that cobalt does not dissipate on calcination.

Specifically, the value was calculated as the following formula.

Content of cobalt in calcined body=59×2/0.33× 1360≈0.263

Amount of cobalt in calcined body=0.3×0.263≈0.079

Ratio of cobalt removed by acid treatment=0.00686/ 0.079≈0.087

(c) Preparation of Electrode

1 µL of the prepared ink-like solution was added dropwise to the polished glassy carbon disk electrode (EC Frontier Co, Ltd.) with an inner diameter of 3 mm (outer diameter of 12 mm), and dried in a sealed container with a humidity of 100% a whole day and night to form an electrode catalyst. The yield was 0.189 g based on 0.669 g of the charged amount. The total yield was calculated from the weight of Poly(TACqPc-TCaCoPc) before calcination and the weight of the electrode catalyst after preparation. The total yield was 28%.

(7) Evaluation of Electrode Catalyst

Measurement was performed on the prepared electrode by a linear sweep voltammetry (LSV) based on a rotary electrode method, and the oxygen reduction activity of the electrode catalyst was evaluated by oxygen reduction potential and oxygen reduction current value. As a rotary electrode apparatus, RRDE-3A manufactured by ALS Co., Ltd was used, and as a potentiostat, DY2325 BI-POTENTIOSTAT manufactured by ALS Co., Ltd was used. LSV measurement was performed in three-electrode system using the prepared working electrode, platinum auxiliary electrode, and silver-silver chloride standard electrode (+0.199 V vs. SHE), with an 0.5 M aqueous sulfuric acid solution as an electrolyte. The potential of the working electrode was swept at a scanning speed of 1 mV/s from +950 mV to −400 mV based on the silver-silver chloride standard electrode, and the electrode rotating speed was set at 200 rpm. First, an electrolyte solution was nitrogen-saturated by bubbling with nitrogen for 30 minutes before measurement, and LSV measurement was performed. Next, the electrolyte solution was oxygen-saturated by bubbling with oxygen for 30 minutes, and LSV measurement was performed. The difference between the current value of voltammogram measured by nitrogen saturation and the current value of voltammogram measured by oxygen saturation was defined as the oxygen reduction current of the electrode catalyst. The results are shown in FIG. 6.

2. Comparative Example 1 (not Acid-Treated Electrode Catalyst)

A calcined body was prepared in the same manner as in Example 1 until "(a) Preparation of calcined body". In "(b) Acid treatment", 5 mg of the sample was weighed and put into a 0.5 ml microtube (manufactured by IWAKI), and 50 µl of a 5% Nafion dispersion solution (Wako Pure Chemical Industries, Ltd.), 150 µl of ethanol and 150 µl of pure water were added thereto, then the microtube was sealed and irradiated with ultrasonic waves for 30 minutes to disperse the sample. An electrode was prepared in the same manner as "(c) Preparation of electrode" in Example 1. An electrode catalyst was evaluated in the same manner as "(7) Evaluation of electrode catalyst" in Example 1. The results are shown in FIG. 6.

It has been found from the result of this figure that current flows in both acid-treated electrode catalyst (Example 1) and non acid-treated electrode catalyst (Comparative Example 1), and the heights of the peak currents are almost the same, thus both electrode catalysts have equivalent excellent oxygen reduction activity. Also, while the current value gradually rose from about −400 mV and turned to the peak current at about +500 mV in Comparative Example 1, rapid rising of the current value could be seen from +200 mV to +500 mV in Example 1. Based on the above, oxygen reduction activity was found to be improved by acid treatment.

3. Example 2 (Synthesis of Poly(Tetraamino Cobalt Phthalocyanine-Tetracarboxy Nickel Phthalocyanine))

Tetracarboxamide nickel phthalocyanine (TAmNiPc) was synthesized in the same manner as in "(3) Synthesis of tetracarboxamide cobalt phthalocyanine (compound of general formula (6))" in Example 1, except for using 4.018 g (0.031 mol) of nickel (II) chloride, in place of cobalt chloride. The resulting (TAmNiPc) was hydrolyzed in the same conditions as in "(4) Synthesis of tetracarboxy cobalt phthalocyanine (compound of general formula (2))" in Example 1 to synthesize tetracarboxy nickel phthalocyanine (TCaNiPc). The resulting (TCaNiPc) and TACoPc obtained in Example 1 were condensed in the same conditions as in Example 1 (5), to obtain poly(tetraamino cobalt phthalocyanine-tetracarboxy nickel phthalocyanine) (Poly(TACoPc-TCaNiPc)). An electrode catalyst was prepared in the same conditions as in "(6) Preparation of electrode catalyst and electrode" using the resulting Poly(TACoPc-TCaNiPc), and the evaluation test as in "(7) Evaluation of electrode catalyst" was performed. The results are shown in FIG. 7.

4. Comparative Example 2 (not Acid-Treated Electrode Catalyst)

A calcined body was prepared in the same manner as in Example 2 until "(a) Preparation of calcined body". In "(b) Acid treatment", 5 mg of the sample was weighed and put into a 0.5 ml microtube (manufactured by IWAKI), and 50 µl of a 5% Nafion dispersion solution (Wako Pure Chemical Industries, Ltd.), 150 µl of ethanol and 150 µl of pure water were added thereto, then the microtube was sealed and irradiated with ultrasonic waves for 30 minutes to disperse the sample. An electrode was prepared in the same manner as "(c) Preparation of electrode" in Example 1, and evaluated in the same manner as "(7) Evaluation of electrode catalyst". The results are shown in FIG. 7.

It has been found from the result of this figure that the acid-treated electrode catalyst (Example 2) has a current peak higher than the non acid-treated electrode catalyst (Comparative Example 2), thus is excellent in the oxygen reduction activity. Also, it has been found that Example 2 is more rapid to rise to the peak current than Comparative Example 2, thus is more highly active electrode.

5. Example 3 (Synthesis of Poly(Tetraamino Cobalt Phthalocyanine-Tetracarboxy Iron Phthalocyanine))

Tetracarboxamide iron phthalocyanine (TAmFePc) was synthesized in the same manner as in "(3) Synthesis of tetracarboxamide cobalt phthalocyanine (compound of general formula (6))" in Example 1, except for using 4.943 g (0.039 mol) of iron(II) chloride, in place of cobalt chloride. The resulting (TAmFePc) was hydrolyzed in the same conditions as in "(4) Synthesis of tetracarboxy cobalt phthalocyanine (compound of general formula (2))" in Example 1 to synthesize tetracarboxy iron phthalocyanine (TCaFePc). The resulting (TCaFePc) and TACoPc obtained in Example 1 were condensed in the same conditions as in Example 1 (5), to obtain poly(tetraamino cobalt phthalocyanine-tetracarboxy iron phthalocyanine) (Poly(TACoPc-TCaFePc)). An electrode catalyst was prepared in the same conditions as in "(6) Preparation of electrode catalyst and electrode" using the resulting Poly(TACoPc-TCaFePc), and the evaluation test as in "(7) Evaluation of electrode catalyst" was performed. The results are shown in FIG. 8. Also, when the filtrate after treatment with aqua regia was analyzed by ICP-MS, cobalt and iron were detected, thus it could be confirmed that a part of the metal contained in the calcined body was eluted.

6. Comparative Example 3 (not Acid-Treated Electrode Catalyst)

A calcined body was prepared in the same manner as in Example 3 until "(a) Preparation of calcined body". In "(b) Acid treatment", 5 mg of the sample was weighed and put into a 0.5 ml microtube (manufactured by IWAKI), and 50 µl of a 5% Nafion dispersion solution (Wako Pure Chemical Industries, Ltd.), 150 µl of ethanol and 150 µl of pure water were added thereto, then the microtube was sealed and irradiated with ultrasonic waves for 30 minutes to disperse the sample. An electrode was prepared in the same manner as "(c) Preparation of electrode" in Example 1, and evaluated in the same manner as "(7) Evaluation of electrode catalyst". The results are shown in FIG. 8.

It has been found from the result of this figure that the acid-treated electrode catalyst (Example 3) has a current peak higher than the non acid-treated electrode catalyst (Comparative Example 3), thus is excellent in the oxygen reduction activity. Also, it has been found that Example 3 is more rapid to rise to the peak current than Comparative Example 3, thus is more highly active electrode.

FIG. 9 is a graph summarizing the results of Examples 1 to 3. From this figure, the high oxygen reduction activity and rapid rising of the current value were seen irrespective of the type of the metal. Based on the above, it has been found that a part of the metal was removed by acid treatment, thereby exhibiting excellent electrode characteristics even in any combination regardless of same or different metals. Among them, it has been found that Example 2 (Poly(TACoPc-TCaNiPc)) in which the peak current value is high and the rising is rapid is particularly excellent.

7. Platinum Catalyst

An electrode was prepared by the method of "(6) Preparation of electrode catalyst and electrode" in Example 1, using a platinum catalyst (catalyst for a fuel cell TEC10E50E manufactured by TANAKA KIKINZOKU KOGYO K.K.). Also, the oxygen reduction current of the electrode was measured by the same evaluation method as in "(7) Evaluation of electrode catalyst" in Example 1. The results are shown in FIG. 10. In addition, the result of Example 1 is shown in the same figure.

It has been found from the result of this figure that the platinum catalyst has a peak of the current value slightly higher than Example 1, and is excellent in electrode characteristics, but even Example 1 has high electrode characteristics not greatly inferior to the platinum catalyst. Therefore, it has been found that the present invention has sufficiently excellent electrode characteristics, even without using platinum or the like.

The invention claimed is:

1. An electrode catalyst obtained by calcining a metal phthalocyanine polymer comprising a repeating structural unit obtained by the amide bonding of a structural unit represented by general formula (1a) to a structural unit represented by general formula (2a) to form a calcined body, then treating the calcined body with an acid,

[Chemical Formula 1]

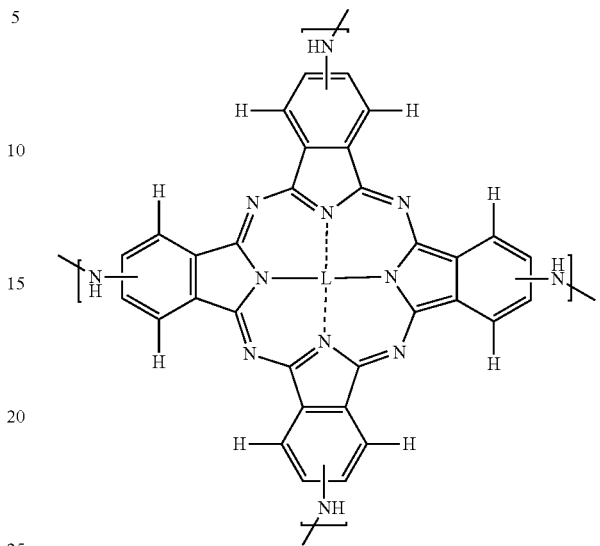

(1a)

(wherein L is a divalent or trivalent metal ion belonging to Period 3 to Period 5 on the long-form periodic table),

[Chemical Formula 2]

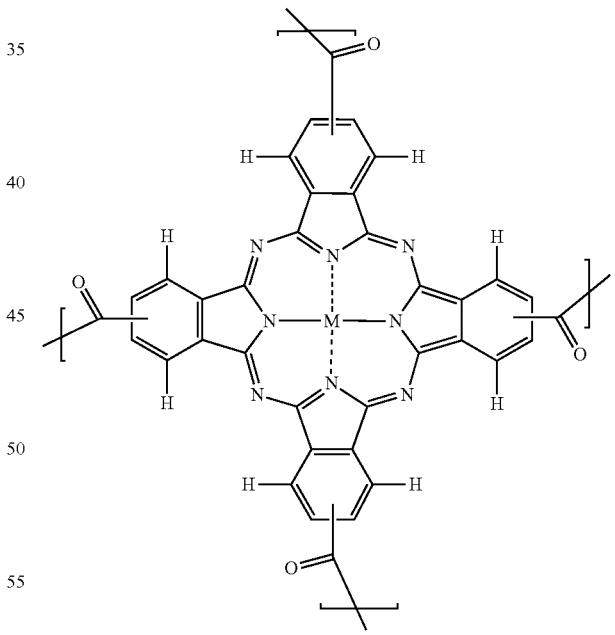

(2a)

(wherein M is a divalent or trivalent metal ion belonging to Period 3 to Period 5 on the long-form periodic table).

2. The electrode catalyst according to claim 1, wherein the L and the M are each independently a metal ion selected from the group consisting of $Co^{2+}$, $Ni^{2+}$ and $Fe^{2+}$.

3. The electrode catalyst according to claim 1, wherein the acid is aqua regia.

4. The electrode catalyst according to claim 1, wherein the calcination is carried out at 800° C. to 1000° C., in a reducing gas atmosphere.

5. An electrode catalyst comprising a calcined body obtained by calcining a metal phthalocyanine polymer comprising a repeating structural unit obtained by amide bonding of a structural unit represented by general formula (1a) to a structural unit represented by general formula (2a),

[Chemical Formula 3]

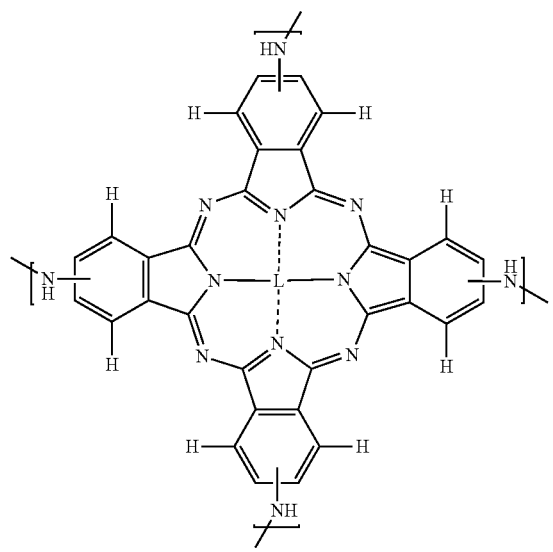

(1a)

(wherein L is a divalent or trivalent metal ion belonging to Period 3 to Period 5 on the long-form periodic table),

[Chemical Formula 4]

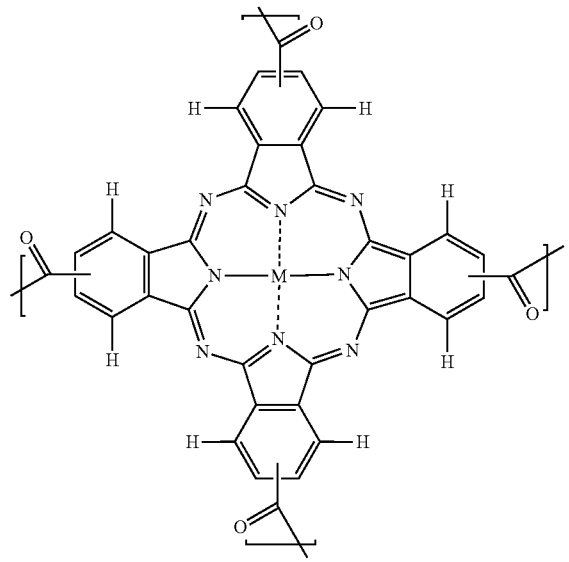

(2a)

(wherein M is a divalent or trivalent metal ion belonging to Period 3 to Period 5 on the long-form periodic table),
wherein the ratio of the total amount of the L and the M is 0 to 99.99% by weight, based on the total amount of the L and the M contained in the metal phthalocyanine polymer before calcination.

6. The electrode catalyst according to claim 5, wherein the L and the M are each independently a metal ion selected from the group consisting of $Co^{2+}$, $Ni^{2+}$ and $Fe^{2+}$.

7. The electrode catalyst according to claim 5, wherein the ratio of the total amount of the L and the M is 50 to 99.9% by weight, based on the total amount of the L and the M contained in the metal phthalocyanine polymer before calcination.

8. The electrode catalyst according to claim 5, wherein the calcination is carried out at 800° C. to 1000° C., in a reducing gas atmosphere.

9. An electrode catalyst obtained by calcining a metal phthalocyanine polymer produced by condensation of a metal aminophthalocyanine compound represented by general formula (1) and a metal carboxyphthalocyanine compound represented by general formula (2), and then acid-treating it:

[Chemical Formula 5]

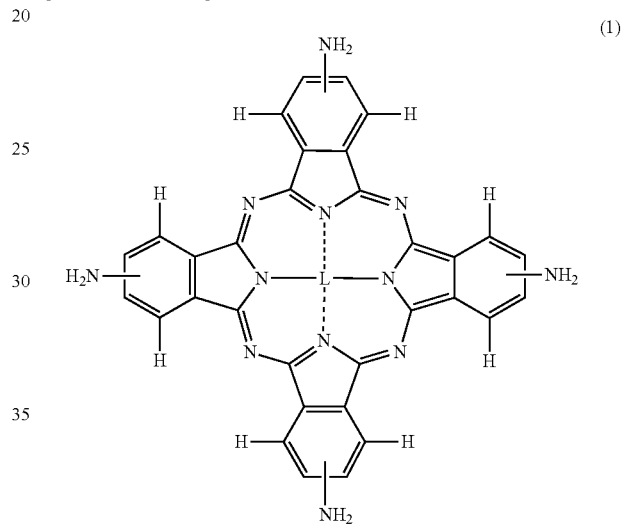

(1)

(wherein L is a divalent or trivalent metal ion belonging to Period 3 to Period 5 on the long-form periodic table),

[Chemical Formula 6]

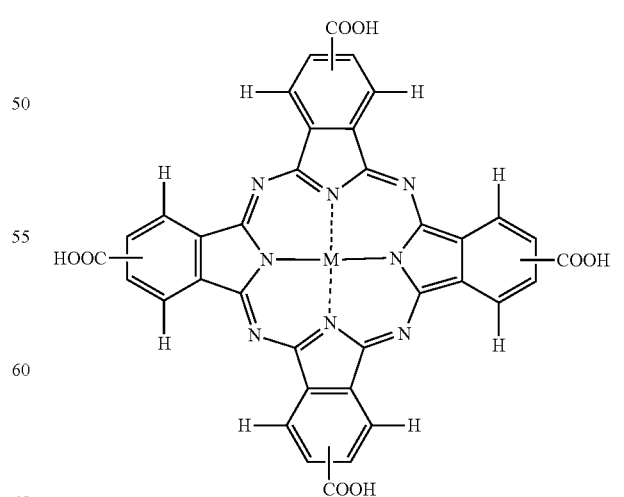

(2)

(wherein M is a divalent or trivalent metal ion belonging to Period 3 to Period 5 on the long-form periodic table).

10. The electrode catalyst according to claim 9, wherein the L and the M are each independently a metal ion selected from the group consisting of $Co^{2+}$, $Ni^{2+}$ and $Fe^{2+}$.

11. The electrode catalyst according to claim 9, wherein the acid is aqua regia.

12. The electrode catalyst according to claim 9, wherein the calcination is carried out at 800° C. to 1000° C., in a reducing gas atmosphere.

13. An electrode catalyst comprising a calcined body obtained by calcining a metal phthalocyanine polymer produced by condensation of a metal aminophthalocyanine compound represented by general formula (1) and a metal carboxyphthalocyanine compound represented by general formula (2),

[Chemical Formula 7]

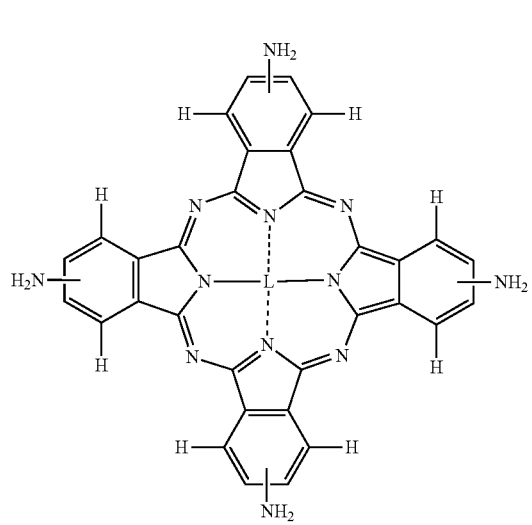

(1)

(wherein L is a divalent or trivalent metal ion belonging to Period 3 to Period 5 on the long-form periodic table),

[Chemical Formula 8]

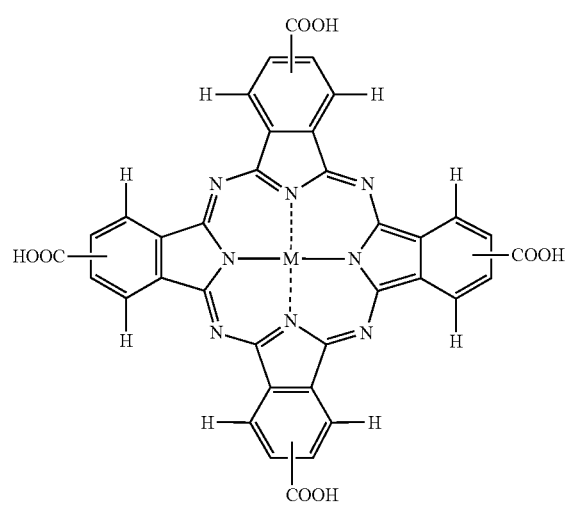

(2)

(wherein M is a divalent or trivalent metal ion belonging to Period 3 to Period 5 on the long-form periodic table), wherein the ratio of the total amount of the L and the M is 0 to 99.99% by weight, based on the total amount of the L and the M contained in the metal phthalocyanine polymer before calcination.

14. The electrode catalyst according to claim 13, wherein the L and the M are each independently a metal ion selected from the group consisting of $Co^{2+}$, $Ni^{2+}$ and $Fe^{2+}$.

15. The electrode catalyst according to claim 13, wherein the ratio of the total amount of the L and the M is 50 to 99.9 by weight, based on the total amount of the L and the M contained in the metal phthalocyanine polymer before calcination.

16. The electrode catalyst according to claim 13, wherein the calcination is carried out at 800° C. to 1000° C., in a reducing gas atmosphere.

17. A method for producing an electrode catalyst comprising the steps of producing a metal phthalocyanine polymer comprising a repeating structural unit obtained by the amide bonding of a structural unit represented by general formula (1a) to a structural unit represented by general formula (2a), comprising condensing a metal aminophthalocyanine compound represented by general formula (1) and a metal carboxyphthalocyanine compound represented by general formula (2), calcining the metal phthalocyanine polymer to form a calcined body, and treating the calcined body with an acid,

[Chemical Formula 9]

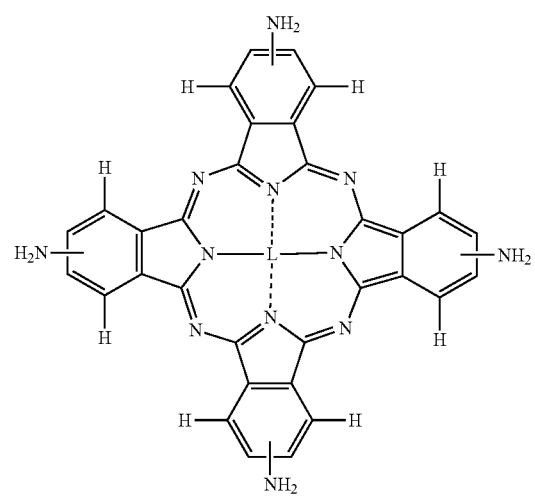

(1)

(wherein L is a divalent or trivalent metal ion belonging to Period 3 to Period 5 on the long-form periodic table),

[Chemical Formula 10]

(2)

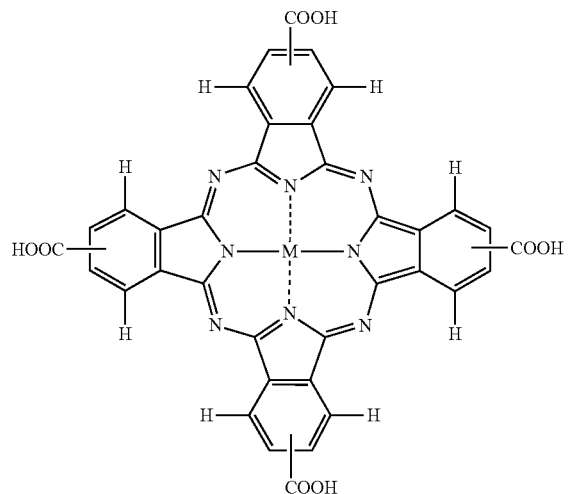

(wherein M is a divalent or trivalent metal ion belonging to Period 3 to Period 5 on the long-form periodic table),

[Chemical Formula 11]

(1a)

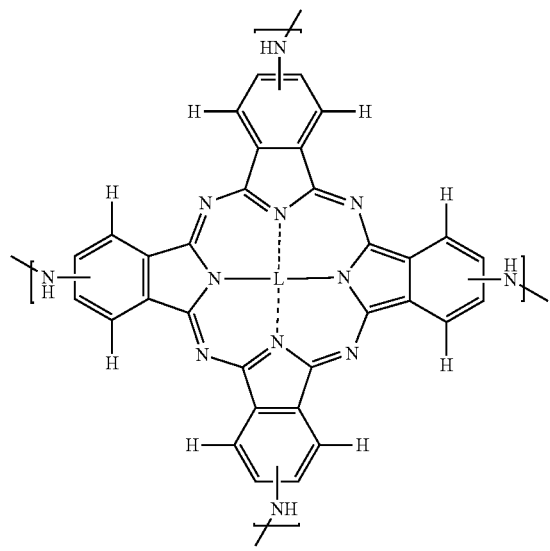

(wherein L is a divalent or trivalent metal ion belonging to Period 3 to Period 5 on the long-form periodic table),

[Chemical Formula 12]

(2a)

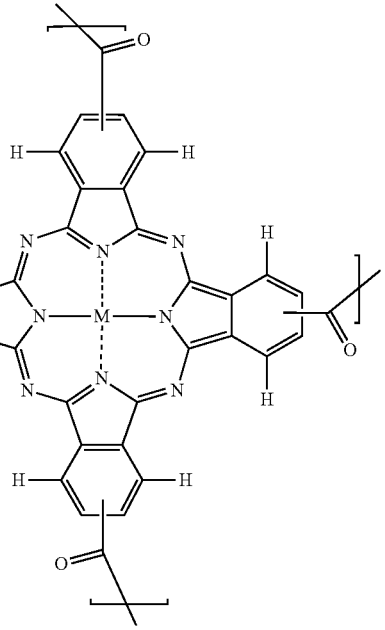

(wherein M is a divalent or trivalent metal ion belonging to Period 3 to Period 5 on the long-form periodic table).

18. The method for producing an electrode catalyst according to claim 17, wherein the L and the M are each independently a metal ion selected from the group consisting of $Co^{2+}$, $Ni^{2+}$ and $Fe^{2+}$.

19. The method for producing an electrode catalyst according to claim 17, wherein the acid is aqua regia.

20. The method for producing an electrode catalyst according to claim 17, wherein the calcination is carried out at 800° C. to 1000° C., in a reducing gas atmosphere.

* * * * *

UNITED STATES PATENT AND TRADEMARK OFFICE
CERTIFICATE OF CORRECTION

PATENT NO. : 10,193,162 B2
APPLICATION NO. : 15/129482
DATED : January 29, 2019
INVENTOR(S) : Nobukatsu Nemoto et al.

Page 1 of 1

It is certified that error appears in the above-identified patent and that said Letters Patent is hereby corrected as shown below:

In the Claims

Column 34, Line 12, Claim 15, delete "99.9" and insert -- 99.9% --

Signed and Sealed this
Ninth Day of April, 2019

Andrei Iancu
*Director of the United States Patent and Trademark Office*